United States Patent [19]
Bublil et al.

[11] Patent Number: 6,012,137
[45] Date of Patent: Jan. 4, 2000

[54] SPECIAL PURPOSE PROCESSOR FOR DIGITAL AUDIO/VIDEO DECODING

[75] Inventors: Moshe Bublil, Sunnyvale; Subroto Bose, Santa Clara; Shirish C. Gadre, San Jose; Taner Ozcelik, Fremont, all of Calif.

[73] Assignees: Sony Corporation, Tokyo, Japan; Sony Electronics Inc., Jointy, Park Ridge, N.J.

[21] Appl. No.: 08/865,749

[22] Filed: May 30, 1997

[51] Int. Cl.[7] .................................................... G06F 15/76
[52] U.S. Cl. ............................... 712/36; 712/32; 712/41; 712/33
[58] Field of Search .................................. 712/23, 32, 36, 712/37, 41, 33; 345/501, 519, 521, 202; 711/100, 103, 105

[56] References Cited

U.S. PATENT DOCUMENTS

| | | | |
|---|---|---|---|
| 5,050,068 | 9/1991 | Dollas et al. | 712/206 |
| 5,371,711 | 12/1994 | Nakayama | 365/230.03 |
| 5,404,552 | 4/1995 | Ikenaga | 712/216 |
| 5,822,606 | 10/1998 | Morton | 712/16 |
| 5,896,528 | 4/1999 | Katsuno et al. | 712/239 |

*Primary Examiner*—Kee M. Tung
*Attorney, Agent, or Firm*—Wood, Herron & Evans, L.L.P.

[57] ABSTRACT

A special purpose reduced instruction set central processing unit (RISC CPU) for controlling digital audio/video decoding. The instruction set includes flow control instructions which incorporate immediate values, used to jump over a small number of instructions, and other instructions used for larger jumps. Also, instructions obtain data from the video decoder of the ASIC in a streamlined fashion, using video decoder addresses hard-coded into the RISC CPU. Further instructions perform manipulations of individual bits of registers used as state/status flags. The RISC CPU includes watchdog functions for monitoring the delivery of data to the RISC CPU from other functional units or from memory, so that the RISC CPU can execute instructions while delivery of data from memory or other functional units is pending, unless that data is necessary for program execution, in which case, program execution stalls until the data arrives. To further reduce instruction latency, if an instruction makes use of the contents of a register that is in the process of being written by an immediately preceding instruction, the RISC CPU "bypasses" the register file, using previous results directly in a subsequent instruction. For the purposes of control and debugging, the PC can be read or written by an external host, and instructions can be loaded directly from the host. Also, pages of instructions can be loaded to or from the instruction memory to allow for an unlimited virtual instruction memory space.

55 Claims, 10 Drawing Sheets

SPECIAL PURPOSE PROCESSOR FOR DIGITAL AUDIO/VIDEO DECODING

FIELD OF THE INVENTION

The present invention relates to a reduced instruction set processor for controlling digital audio/video processing.

BACKGROUND OF THE INVENTION

Techniques for digital transmission of television programs promise increased flexibility, higher resolution, and better fidelity. Recent industry collaborations have brought digital television closer to reality; digital television transmission and storage standards have been generated, and consumer digital audio/video storage and retrieval products have begun to appear. The move toward digital audio/video has been encouraged by the commercialization of digital technologies in general, such as personal computers and compact discs, both of which have increased consumer awareness of the possibilities of digital technology.

Personal computers, which have recently become common and inexpensive, contain much of the computing hardware needed to reproduce digital audio/video programs, including a microprocessor/coprocessor for performing numeric calculations, input and output connections, and a large digital memory for storing and manipulating image data. Unfortunately, personal computers are not suitable for consumer digital television reception or digital audio/video decoding, because the microprocessor in a personal computer is a general purpose processor, and typically cannot perform the calculations needed for decompression of digital video fast enough to produce full-motion, high definition video output.

Accordingly, there is a need for a special purpose processor particularly suited for performing digital audio/video-related calculations, which can be used as a digital audio/video receiver in consumer applications.

SUMMARY OF THE INVENTION

In accordance with the present invention, the above needs are met by an application specific integrated circuit (ASIC) for performing digital video processing, which is controlled by a reduced instruction set CPU (RISC CPU) which controls computations performed by other parts of the ASIC when performing digital audio/video reception.

The instruction set supported by this RISC CPU, includes several features particularly suited for fast and efficient control of digital audio/video processing. The instructions in the instruction set are kept relatively small, e.g., 16-bits, to reduce complexity and enhance speed. At the same time, various features of the instructions permit highly flexible processing of supervisory programs for controlling operations of the ASIC.

One result of the short length of the instructions, is that flow control instructions such as branch, jump and call can cannot include a complete address for a location in the program memory. This difficulty is overcome, however, by including in the instruction set two kinds of flow control instructions. A first kind of flow control instruction causes the content of a CPU register to be substituted into the program counter. Since CPU registers are 32-bits in width, this instruction can cause program flow to sequent to any location in the program memory. The second kind of flow control instruction includes, within the instruction itself, a pointer. This second kind of flow control instruction causes the pointer included therein, to be concatenated to one or more of the most significant bits of the program counter, with the result being substituted into the program counter. As a result, the latter kind of instruction permits a jump only to locations within a limited range in the program memory, for example, within a current block of the program memory of a size determined by the number of bits in the pointer included in the instruction. Nevertheless, the latter kind of instruction is sufficiently flexible to be used in many small loops in the instruction memory, with consequent savings of time and register space as compared to the first kind of instruction.

A second feature of the instruction set is a group of instructions for obtaining data from other functional units of the ASIC. There are also two kinds of these instructions. The first kind of instruction identifies the address of a specific functional unit from which data is desired, using an address incorporated within the instruction. The second kind of instruction is used only for communicating with the video decoder of the ASIC, to facilitate the rapid and frequent communication to this functional unit. The address of the video decoder is hard-wired into the hardware forming the RISC CPU, so that in response to the second kind of instruction, the desired video decoder address can be immediately generated and delivered as an access request, without requiring the address to be retrieved from body of the instruction. The inclusion of the second kind of instruction thus simplifies the production of software for the CPU, as well as speeds the execution of instruction communicating with the video decoder.

A third aspect of the instruction set is the inclusion of SET and RESET instructions, which can be used to set or clear a specific, identified bit of a specific register of the CPU. There is also a BITI instruction for testing the value of a specific bit of a register. In many audio/video decoding applications, there are a large number of condition and state flags, and one or more registers are used as a collection of flag bits for tracking the these conditions and states. For such applications, the SETF, RESETF and BITI instructions can substantially simplify the frequent operations of setting, resetting or testing a particular bit in a register.

The RISC CPU also includes features for speeding the execution of instructions. Specifically, there is a multiplexer at the output of the register file in the CPU, having first and second inputs. The first input of the multiplexer connects to the output of the register file at which the contents of a register in the register file are produced in response to an instruction, and the second input of the multiplexer connects to the input to the register file, at which new contents for a register are delivered for writing to a register in response to an instruction. A watchdog logic circuit monitors data written into the register file. The multiplexer normally delivers the signals from its first input to its output. However, if an instruction makes use of the contents of a register that is in the process of being written by an immediately preceding instruction, the watchdog logic causes the multiplexer to output the signals from its second input. Thus, the multiplexer "bypasses" the register file, so that it is not necessary to wait for the data to be stored into the register file before it can be used in a subsequent instruction. This function thus reduces the latency of sequences of instructions in which instructions use the results of immediately preceding instructions.

The watchdog logic performs a second function to increase processing speed. Specifically, after executing an IN or LD instruction, which retrieves data into a register in the register file from other functional units or from memory, respectively, the identity of the register to which the data will be written, is stored. Since there can be a substantial delay before data is returned from memory or the other functional unit, after requesting the data in response to the IN or LD instruction, the RISC CPU continues to subsequent instructions, without waiting for the data to return. So long as the subsequent instructions do not attempt to use the registers awaiting data returned from memory or other functional units, the subsequent instructions can be executed. However, if a subsequent instruction attempts to use one of the registers awaiting data returned from memory or other functional unit, the watchdog logic will stall the RISC CPU until the data is returned. Specifically, the watchdog processor will inspect the stored identities of registers to which data is pending arrival, and detect any instruction attempting to use one of those registers, and stall processing of the instruction until the data has been delivered. This second watchdog capability substantially increases the speed of processing, in that it eliminates any unnecessary delays in execution of instructions while data is pending return from memory or other functional units.

Additional features of the RISC CPU speed execution. Specifically, the RISC CPU includes an on-chip, scratchpad memory for storing data processed by the RISC CPU. The instructions which control operations of the RISC CPU to store or retrieve data can specify whether data is to be stored into the scratchpad memory or into the main data memory accessible to the chip. The inclusion of the scratchpad memory substantially speeds operations of the RISC CPU which make use of the scratchpad memory, by reducing latency of memory access.

For the purpose of independent control and monitoring of the RISC CPU, the RISC CPU incorporates various features. Specifically, the internal program counter of the RISC CPU can be read and written directly by an external host. Furthermore, an instruction can be directly written from the external host into the instruction register of the RISC CPU. These features permit direct control of the RISC CPU, and monitoring of its operations, and are useful in debugging of hardware and software.

Finally, the RISC CPU, interacting with the surrounding circuitry on the ASIC, facilitates "paging" of instructions in the program memory used by the RISC CPU. Specifically, blocks or "pages" of instructions can be swapped into the instruction memory of the RISC CPU from main memory. As a result of this feature, the RISC CPU can appear to have an unlimited virtual instruction space.

The above and other aspects, objects and advantages of the present invention shall be made apparent from the accompanying drawings and the description thereof

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENT

Figure 1:
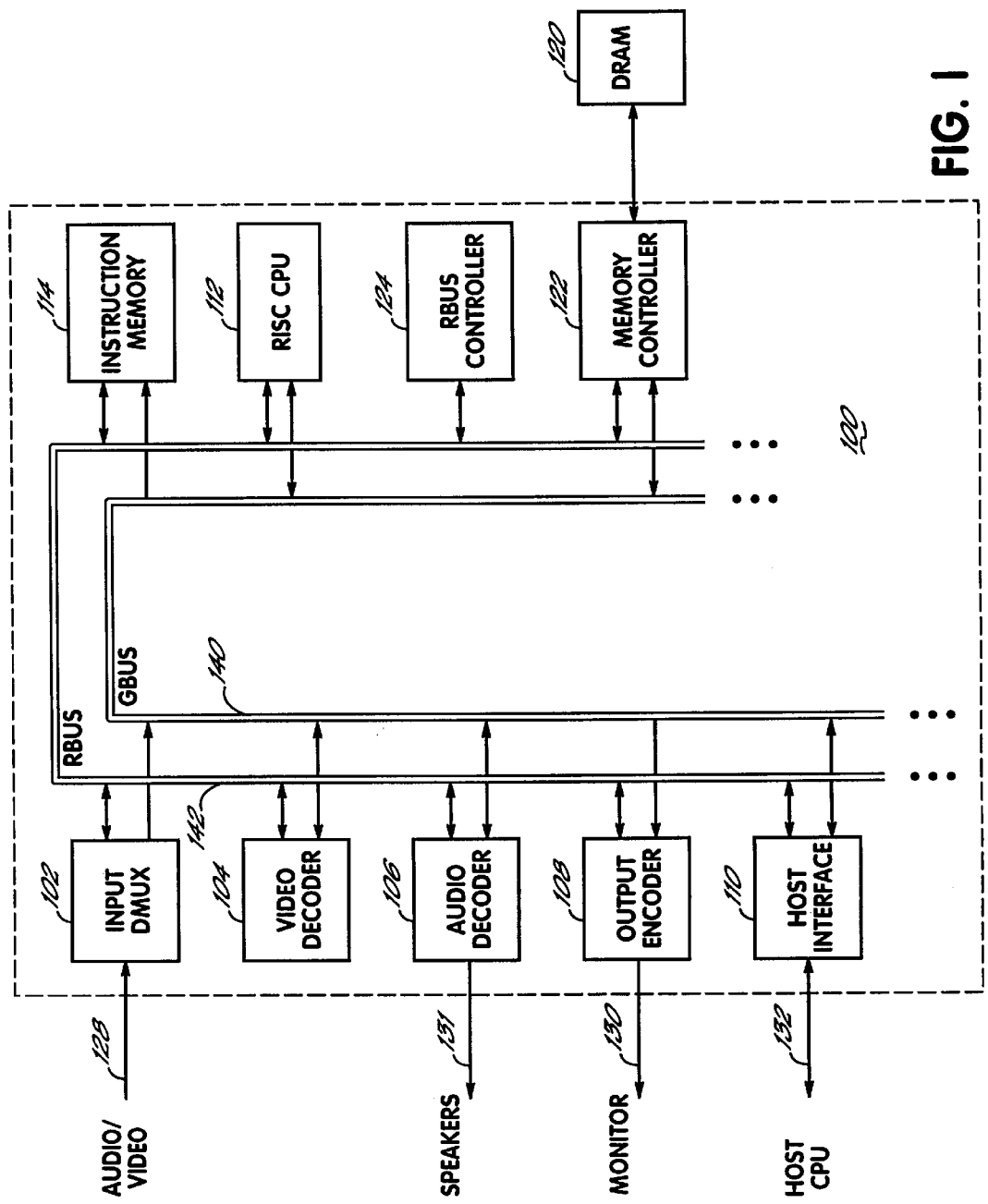
FIG. 1 is a block diagram of an application specific integrated circuit (ASIC) for performing digital audio/video signal decompression and output, illustrating in particular various functional units and a reduced instruction set central processing unit (RISC CPU) in accordance with principles of the present invention, for controlling the operations of the other functional units.

Referring to FIG. 1, in accordance with the principles of the present invention, an application specific integrated circuit (ASIC) 100 incorporates various functional modules 102 through 112 which perform audio/video decoding and audio decoding tasks for the purposes of digital audio/video reception. It will be understood that the functional units illustrated in FIG. 1 are exemplary, and in a practical implementation, additional functional units might be included. For example, in one implementation used with the RISC CPU discussed herein, there are 20 such functional units. Each of the functional units 102 through 112 interacts in various ways with a large off-chip memory 120, which is a dynamic random access memory or DRAM. Access to DRAM 120 is controlled by a memory controller 122 on the ASIC 100.

For exemplary purposes, a few of the functional units of the ASIC 100 will be described. These functional units include an input demultiplexer 102 which receives the digital input signal on line 128, parses this digital input signal into video, audio and other commands, and stores the input signal into buffers in DRAM 120 using memory controller 122. A video decoder 104 retrieves video information stored in a buffer in DRAM 120, decodes the video information (using frequent and repetitive accesses to DRAM memory 120) in accordance with the video encoding scheme in use, and after decoding delivers the video information to output encoder 108 for output on a monitor via bus 130. An audio decoder unit 106 retrieves audio information from DRAM 120, decodes the audio information for output, and delivers the audio information for output to speakers via bus 131.

ASIC 100 also includes a host interface 110 for interacting with a host computer via lines 132 to permit the host computer to monitor and control operations of the ASIC 100.

In addition to the illustrated functional units, there may be one or more additional video decoding units for decoding subpicture video information which may incorporate subtitles or other information that accompanies the main video being decoded by decoder 104. Furthermore, on-screen displays may be generated within ASIC 100 by an OSD section connected to RBUS 142 and GBUS 140. On-screen displays can be generated in response to commands received from the host CPU to provide feedback on the operation of the host CPU and/or the playback or reception status of the device in which ASIC 100 is being used.

Control of the application specific integrated circuit 100 is provided by a reduced instruction set central processing unit (RISC CPU) 112 which controls and monitors the operation of each of the other functional units on the ASIC 100. RISC CPU 112 responds to 16-bit instructions, which are stored in an instruction memory 114. Instruction memory 114 holds 4096 16-bit instructions, adequate for relatively straightforward programs of the ASIC 100. For more complex programs that might be performed by the ASIC 100, "pages" of 4096 instructions can be swapped in and out of program memory 114 from a much larger instruction buffer in DRAM 120, as described below.

As illustrated in FIG. 1, RISC CPU 112 interacts with each of the functional units in ASIC 100 via two main busses, known as the GBUS 140 and the RBUS 142. Specifically, each functional unit is connected to the 64 bit GBUS 140 through which data may be retrieved and delivered to the memory controller 122, and thus to or from memory 120. Furthermore, blocks of data may be transferred from one functional unit to another functional unit via the GBUS.

Requests for memory access or transfer, as well as various other commands, are passed from one functional unit to others via RBUS 142. RBUS 142 may comprise one or more 32-bit busses, used by functional units making frequent memory accesses, or a single 8-bit, time multiplexed bus shared by several functional units. An RBUS controller 124 receives requests for use of RBUS 142, arbitrates between these requests as necessary, and delivers access to the RBUS to the highest priority requesting functional unit.

When a memory access is requested, the requesting functional unit 102 through 112 delivers a virtual address over RBUS 142 to memory controller 122. The memory access request may request delivery of a single memory location, or may include an identification of a number of memory locations to be accessed in response to the request. Memory controller 122 responds to the request by managing access to the identified locations in DRAM 120 in response to the request. If multiple requests for memory access are pending at any time, memory controller 122 arbitrates between the pending requests to permit access to the highest priority requesting functional unit. Further details on the operation of the memory controller 122 in response to requests can be found in copending U.S. patent application Ser. No. 08/846,590, entitled "MEMORY ADDRESS GENERATION FOR DIGITAL VIDEO", naming inventor Edward J. Paluch and filed on Apr. 30, 1997, which is hereby incorporated in its entirety herein by reference.

Additional data on the status of various functional units is available via RBUS 142. Functional units provide status information which can be accessed at a particular address identified via the RBUS. Thus, for example, to access a status word from the video decoder 104, an access request identifying the DEC_VALUE address is delivered to the RBUS controller. In response, the RBUS controller 124 causes the video decoder's status word to be delivered to the requesting functional unit.

Commands are also sent to functional units via RBUS 142. To deliver commands to a functional unit, the commands are forwarded to a particular address for the functional unit via the RBUS. Thus, for example, to deliver a command to the video decoder 104, an access request identifying the VLD_CMD address is delivered to the RBUS controller. In response, the RBUS controller 124 enables the requesting functional unit to deliver the command to the RBUS, and causes video decoder 104 to receive the command into its command buffer.

Figure 2A:
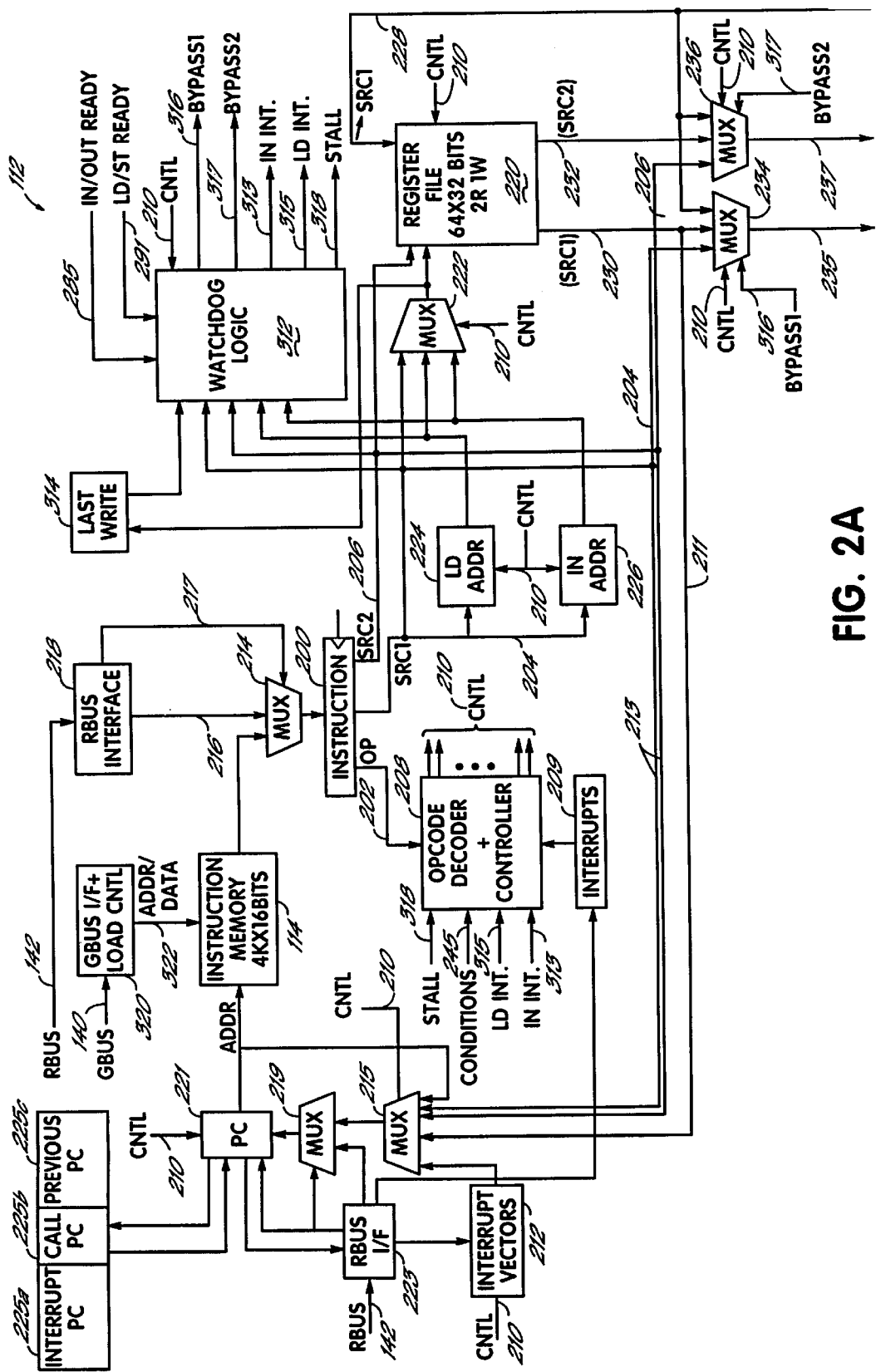
FIGS. 2A and 2B are a block diagram of the central processing unit of FIG. 1, illustrating its internal structure which supports various high speed operations necessary for control of digital audio/video processing.
Figure 2B:
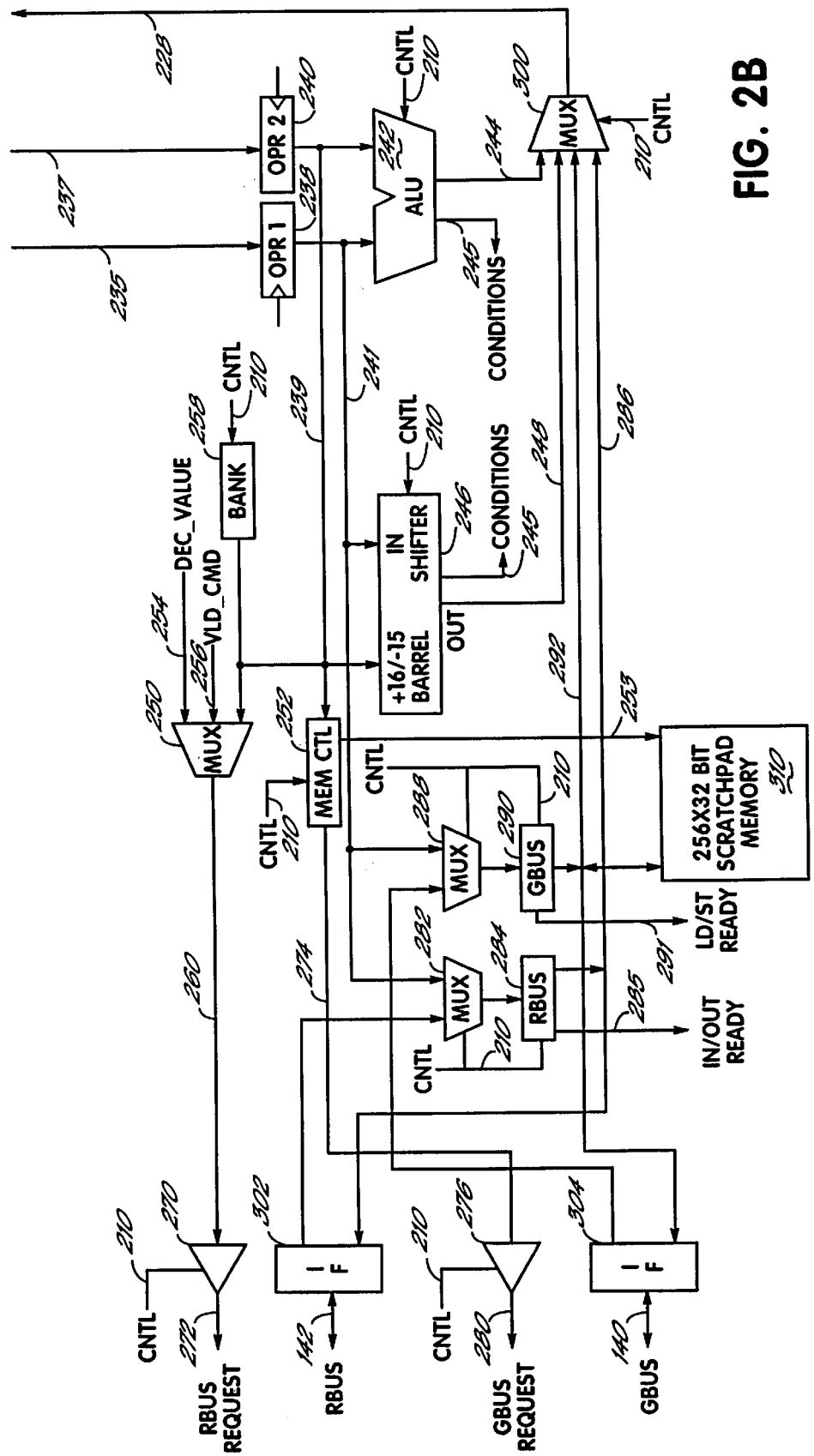

Referring now to FIGS. 2A and 2B, the detailed structure of RISC CPU 112 can be discussed. As noted above, RISC CPU 112 performs operations in response to instructions received from instruction memory 114, which is shown along with the other structure of RISC CPU 112 in FIGS. 2A and 2B. Instructions from instruction memory 114 are delivered to a 16-bit instruction register 200 inside of RISC CPU 112 for controlling operations of the RISC CPU.

Instructions stored in instruction register 200 comprise an opcode portion, and may also include an operand portion. As noted above, the instructions are 16-bits in length; thus, the opcode and operands for any given instruction total 16 bits. However, different instructions may have different opcode and operand lengths. For example, a first category of instructions includes a 4-bit opcode combined with a 12-bit operand area. Instructions in this category include arithmetic instructions such as an ADD(src1,src2) instruction, which causes RISC CPU 112 to add the contents of the register identified by a first 6-bit operand src1, to the contents of the register identified by a second 6-bit operand src2, and store the result into the register identified by the first operand src1.

A second category of instructions includes a 5-bit opcode and a single 11-bit operand. Instructions in this category include logical operation instructions such as an SHI(src1, imm5), which causes RISC CPU 112 to shift the contents of the register identified by a first 6-bit operand src1 a number of placed identified by a second 5-bit operand imm5.

A third category of instructions includes a 4-bit opcode and a single 12-bit operand. Instructions in this category include flow control instructions such as a CALL(target) instruction, which causes RISC CPU 112 to sequence to an instruction at a location in instruction memory 114 identified by a 12-bit operand target. (See FIG. 5B, below)

Thus, although in 4-bit instructions, the opcode is found in four bits of the instruction, for other instructions, the opcode can be relatively long, and incorporate many of the bits of the instruction. Furthermore, while in some instructions, the opcode is found in the most significant bits of the instruction, before the operands, in the case of other instructions, the opcode may be found in the least significant bits of the instruction, after the operands (if any); alternatively, the opcode bits may be split between the more and less significant bits of the instruction, with the operand bits found in the central section of the instruction. Any or all of these approaches may be used, so long as each instruction and its arguments can be uniquely identified as a particular opcode and operands, and selected from bits of instruction register 200.

The following discussion provides specific details on various instructions supported by RISC CPU 112, for the purpose of greater explanation of particular operations.

Furthermore, a table identifying and describing all of the instructions supported by RISC CPU 112, in accordance with one embodiment of the present invention, is provided below. Throughout the following description, as components of the RISC CPU 112 are described, reference will be made to particular instructions and to the manner in which particular components of RISC CPU 112 support those instructions.

In accordance with the foregoing, 16-bit instruction register 200 delivers at its output, an opcode bus 202 as well as two operand busses 204 and 206. Specifically, all sixteen bits of the instruction in instruction register 200 are delivered as an OPCODE signal on bus 202 from instruction register 200. The 16-bit signal on bus 202 can be used to identify the opcode of every instruction in instruction register 200. All sixteen bits of the instruction register 200 are provided on bus 202, so that any bits in the instruction can be part of identifying the opcode. In some cases, as few as four bits of the instruction must be reviewed to identify the instruction; however, in some cases, as noted above, five, six or more bits of the instruction, in various locations, must be reviewed to identify the instruction. As noted above, so long as each instruction can be identified unambiguously, the placement of the opcode bits can be performed in any convenient manner.

The twelve least significant bits of the instruction, which for some instructions identify registers used by RISC CPU 112 in executing instructions, and/or contain binary values used as operands for instructions, are delivered on busses 204 and 206. Specifically, the six least significant bits of the instruction in instruction register 200 (i.e., bits 0 through 5) are delivered on bus 206 for use as a second operand for execution of instructions. The next more significant six bits in instruction register 200 (i.e., bits 6 through 11) are delivered on bus 204 for use as a first operand for execution of instructions.

Functions of the RISC CPU 112 in response to an instruction, are controlled by an opcode decoder and controller 208. Controller 208 is connected to the opcode bus 202 to receive the opcode for a current instruction being delivered from memory. Controller 208 is further responsive to an interrupt register 209, containing interrupt flags set through an RBUS interface as discussed below. Controller 208 also receives various status bits from components of RISC CPU 112 to determine a status thereof and to control operations of the RISC CPU 112.

Controller 208 produces, on lines 210, control signals which are delivered to the various components of the RISC CPU 112 to control their operations. Controller 208 comprises various combinational logic for producing control signals on lines 210 in response to the opcode received from bus 208, interrupt flags in registers 209, and other status signals received by controller 208. Specific details of the operations performed by RISC CPU 112 under control of controller 208 will be described below with reference to FIGS. 3A–6B.

Instructions are delivered to instruction register 200 from instruction memory 114 via a multiplexer 214. Multiplexer 214 receives, as a first input, the output of instruction memory 114. This output contains a single instruction of the 4096 instructions stored in memory 114, as selected by a program counter (PC) register 221. The output of PC register 221 is a 14-bit address identifying a location of a current instruction in memory 114. PC register 221 is responsive to command signals on lines 210 from controller 208, to cause the value of PC register 221 to increment as each instruction is processed by controller 208. PC register 221 can be further controlled to receive a specific address, so that program flow can sequence directly from one location in the program in instruction memory 114 to another location.

Specifically, PC register 221 is connected to a stack memory, comprising three memory segments 225a, 225b and 225c. The stack memory stores PC values which can be written into PC register 221 under control of an instruction. Segment 225a is used to store the PC to which execution should return after an interrupt (see below). Segment 225b is used to store the PC to which execution should return after a subroutine call (see below). (In one particular implementation of the present invention, segments 225a and 225b comprise two registers in register file 220. In this implementation, software in instruction memory 114 may read the post-interrupt or post-call return PC in the same manner as other register values in register file 220, if these values are of interest.) Segment 225c holds the value of the PC prior to any recent increment. This last segment may be used to pause execution at a given PC, by continuously writing from segment 225c to PC register 221.

PC register 221 may also be written via multiplexor 215 under software control. Specifically, PC register 221 is responsive to control signals on lines 210, to deliver a substitute program address to program counter register 221. Multiplexer 215 is a 14-bit multiplexer, which receives three 14-bit inputs.

The first input of multiplexer 215 is connected to a 14-bit signal derived from the current output of the PC register 221 and the current contents of instruction register 200. Specifically, the first and second 6-bit operand signals output from instruction register 200 on busses 204 and 206, are concatenated together into a 12-bit bus 213, and delivered to the twelve least significant bits of the first input of multiplexer 215. The two most significant bits of the first input of multiplexer 215 are derived from the two most significant bits of the output of PC register 221. Controller 208 uses the first input of multiplexer 215 when performing flow control instructions such as BRANCH or CALL, discussed below with reference to FIGS. 5A and 5B.

The second input of multiplexer 215 is connected to a 14-bit bus 211. This bus contains the fourteen least significant bits of the content of a first source register, delivered by register file 220 on lines 230 (see below). Controller 208 uses the second input of multiplexer 215 to perform flow control instructions such as JUMPR and CALLR, discussed below with reference to FIGS. 5A and 5B.

The third input of multiplexer 215 is connected to the output of interrupt vector memory 212. Memory 212 identifies entry points (instruction addresses) for sequences of instructions in instruction memory 114 which form interrupt service routines. An RBUS interface 223 is responsive to command signals received over the RBUS 142 to set interrupt bits in interrupt register 209. RBUS interface 223 further stores interrupt vectors into memory 212. RBUS interface circuit 218 can receive data from the RBUS in the same manner as other locations on the RBUS 142, and thus can perform these actions in response to commands from other functional units, in particular the host interface 110 (FIG. 1). In response to an interrupt bit in register 209 being set (and if interrupts are enabled), controller 208 will instruct memory 212 to deliver the address of the first instruction in the corresponding interrupt service routine to the third input of multiplexer 215, and instruct multiplexer 215 to deliver this address to PC register 221, so that processing will sequence to the interrupt service routine. Meanwhile, the current address in the PC register 221 will be pushed into an interrupt segment 225a of the stack memory. At the end of the interrupt service routine, as identified by an RTI instruction, causes controller 208 to generates control signals on lines 210 instructing PC register 221 to pop the previously-stored address back into the PC register 221, to continue execution at that point. In this way, controller 208 responds to interrupt vectors stored in memory 212 and interrupt flags in register 209 to interrupt processing in response to commands or status information received from RBUS interface 223. Interrupts are assigned relative priorities; thus, if multiple interrupts are set, the higher priority interrupts will be serviced first.

Controller 208 can be placed into a mode in which interrupts are disabled, and any interrupts will be ignored; as detailed in the instruction table, an instruction DINT is used to place controller 208 into this mode, and an instruction EINT is used to exit the controller from this mode to re-enable interrupts. Furthermore, controller 208 will not respond to interrupts which are received between IMM16 and MOVI instructions, or 2 and MOVI0 instructions, as described in the instruction table.

The output of multiplexer 215 is a 14-bit signal identifying an address in memory 114 to which processing should sequence. This 14-bit signal is connected to the first input of a second multiplexer 219. The second input of multiplexer 219 is connected to an output of RBUS interface 223. The control input of multiplexer 219 is also connected to an output of RBUS interface 223. The output of multiplexer 219 is connected to the input of PC register 221.

RBUS interface 223 can use these connections to force the RISC CPU to sequence to a particular location in the program of instructions stored in instruction memory 114. Specifically, if a particular address is written to RBUS interface 223, RBUS interface 223 delivers this address to the second input of multiplexer 219, and controls multiplexer 219 to deliver the signals received at the second input of multiplexer 219 to PC register 221. As a result, the address delivered through RBUS interface 223 is stored into PC register 221, so that the next instruction delivered from instruction memory 114 to instruction register 200 is the instruction identified by RBUS interface 223. This functionality can be used to force RISC CPU 112 to a specified location in the software in instruction memory 114, for the purposes of initialization or error recovery.

RBUS interface 223 is further connected to PC register 221, enabling RBUS interface 223 to retrieve the current PC from PC register 221 and deliver this value to the RBUS 142. Accordingly, a supervisory CPU may determine the current PC and may also force the PC to a desired value.

If RBUS interface 223 is not thus controlling the PC register 221, RBUS interface 223 causes multiplexer 219 to deliver the signals generated by multiplexer 215 to PC register 221. As noted above, controller 208 may instruct PC register 221 to increment the address stored therein, or may respond to a flow control instruction by delivering a new address tb PC register 221 via the first, second or third inputs of multiplexer 215.

As noted above, instructions are delivered to instruction register 200 via multiplexer 214. Multiplexer 214 also receives a second input on bus 216 from a second RBUS interface circuit 218 connected to the RBUS 142 (see FIG. 1). Furthermore, a control input of multiplexer 214 is connected to a control signal generated on line 217 by RBUS interface circuit 218. RBUS interface circuit 218 can receive data from the RBUS in the same manner as other locations on the RBUS 142. RBUS interface circuit 218 is used to force delivery of a particular instruction, via RBUS 142, to RISC CPU 112. Specifically, the instruction to be delivered to RISC CPU 112 is delivered via RBUS 142 to RBUS interface circuit 218. RBUS interface circuit 218 responds by delivering the received instruction via bus 216 to multiplexer 214. At the same time, RBUS interface circuit 218 delivers a control signal on line 217 causing multiplexer 214 to deliver the instruction on bus 216 to instruction register 200. As a result, instruction register 200 will deliver the received instruction to the RISC CPU 112 instead of any instruction selected in instruction memory 114. This mechanism for forcing an instruction into RISC CPU 112 can be used in debugging of software or hardware of RISC CPU 112 (e.g., via a host computer connected through host interface 110 (FIG. 1)).

RISC CPU 112 further includes a register file 220 including the registers used by RISC CPU 112 in performing calculations in response to instructions from instruction memory 114. Register file 220 includes sixty-four 32-bit registers, and a single temporary register. Register file 220 receives a first 6-bit input address from a multiplexer 222, and receives a second 6-bit input address from bus 206. In response to these two input addresses, register file 220 retrieves the contents of one of the 64 registers identified by the input addresses, and delivers the contents of these registers to busses 230 and 232. The 6-bit address input to register file 220 from multiplexer 222 identifies a first source register src1 to be used in a computation, and the contents of this register (src1) are output on bus 230. The 6-bit address input to register file 220 from bus 206 identifies a second source register src2 to be used in a computation, and the contents of this register (src2) are output from register file 220 on bus 232. The temporary register can also be used to store and retrieve information, based on control signals received by register file 220 on lines 210.

Register file 220 further receives data on bus 228 to be stored into registers in register file 220. Specifically, the data on bus 228 is stored in the location identified by the 6-bit src1 address produced by multiplexer 222. Accordingly, as can be seen from the instruction table provided below, register file 220 will store the results of various operations performed using the contents of first and/or second source registers, into the first source register.

As noted above, the address of the first source register in register file 220 is produced by a multiplexer 222. Multiplexer 222 is a 6-bit multiplexer, having three inputs, and controlled by control signals on lines 210 from controller 208. The first input to multiplexer 222 is connected to the 6-bit bus 204 delivered from opcode register 200, which identifies the first argument of an instruction. The second input to multiplexer 222 is connected to the 6-bit output of a LD ADDR register 224. The third input to multiplexer 222 is connected to the 6-bit output of an IN ADDR register 226. Multiplexer 222 selects the signals delivered at one of these three inputs, for delivery as an output signal to register file 220.

As described in substantially greater detail below, LD ADDR register 224 and IN ADDR register 226 store addresses of registers in which data will be stored at some future time. As described below, whenever an IN or INVLD instruction, or a LD instruction, is executed to fetch data from memory via the an RBUS register or from the GBUS, respectively, there is a substantial delay until the RBUS or GBUS interface permits the requested information to be retrieved and delivered to RISC CPU 112. While the data is pending arrival, RISC CPU 112 will proceed to execute subsequent instructions so long as those instructions do not require the data pending arrival. To allow the data to be stored in the appropriate location after retrieval, and to stall operation of the RISC CPU if a subsequent instruction requires the data, the address of the register which is to receive the data is stored in the LD ADDR register 224 or IN ADDR register 226. The LD ADDR register 224 identifies the address of a register in register file 220 to which data is pending delivery from DRAM memory via the GBUS, in response to a LD instruction. The IN ADDR register 226 identifies the address of a register in register file 220 to which data is pending delivery from memory via the RBUS in response to an IN or INVLD instruction. When the data is delivered from the RBUS or GBUS, as appropriate, controller 208 causes the address in the IN ADDR or LD ADDR register to be delivered to register file 220 via multiplexer 222, so that the data can be written to the appropriate register, and clears the IN ADDR or LD ADDR register. Furthermore, while the data is pending delivery, a watchdog circuit (discussed below) monitors subsequent instructions to ensure that subsequent instructions do not attempt to make use of the registers whose addresses are identified by LD ADDR and IN ADDR.

Multiplexers 234 and 236 illustrated in FIG. 2A receive the (src1) and (src2) output signals on busses 230 and 232 from register file 220, as well as other input signals to be described, and produce output signals for on busses 235 and 237 for storage in a first operand register OPR1 238 (FIG. 2B), and a second operand register OPR2 240 (FIG. 2B), to provide this data for use in various operations to be discussed below.

In addition to the outputs of register file 220, multiplexers 234 and 236 receive, at second inputs thereof, the 6-bit operand signals on busses 204 and 206, respectively. This connection permits binary operand values in an instruction (so called "immediate values") to be delivered via busses 204 and/or 206 to operand registers OPR1 and OPR2 via multiplexers 234 and 236.

For example, there are instructions for placing immediate values into the OPR1 and OPR2 registers of RISC CPU 112 for use in a computation. Relatively short immediate values (i.e., five or six bits) are provided as part of single instructions (discussed below). Lengthy immediate values are initially delivered into a register of RISC CPU 112, for subsequent use in computations. Specifically, there is an instruction MOVI0(imm[11:0]) having a 4-bit opcode and 12-bit operand. This instruction causes RISC CPU 112 to load a 12-bit operand imm[11:0] into the OPR2 register via the second inputs of multiplexers 214 and 216. These twelve bits are then passed through the ALU 242 and multiplexer 300 (discussed below with reference to FIG. 2B) to bus 228, and stored into the least significant bits of register 0 of the RISC CPU 112 (i.e., bits 0 through 11 of register 0). A companion instruction IMM22(imm[21:12]) having a 6-bit opcode and 10 bit operand, causes RISC CPU 112 to load the 10-bit operand imm[21:12] into the OPR2 register, and then deliver these 10 bits via ALU 242 and multiplexer 300 to the more significant places of register 0 (i.e., bits 12 through 21 of register 0). At this point, a 22-bit immediate value is available in register 0 for use in a subsequent computation.

A similar instruction pair includes MOVI(src1,imm[5:0]), which has a 4-bit opcode, a first 6-bit operand src1 and a second 6-bit operand imm[5:0]. MOVI causes RISC CPU 112 to load the 6-bit second operand imm[5:0] into the OPR2 register, and then through ALU 242 and multiplexer 300 and into the six least significant bits of the register identified by the first 6-bit operand src1. The companion to the MOVI instruction is an instruction IMM16(imm[15:6]), having a 6-bit opcode and a 10-bit operand, which causes RISC CPU 112 to load the 10-bit operand imm[15:6] into the OPR2 register, and then through ALU 242 and multiplexer 300 to the more significant places of the register identified by operand src1 (i.e., bits 7 through 15 of that register). As a result, a 16-bit value is available in the register identified by operand src1 for use in subsequent calculations.

In addition to the immediate value connections to busses 204 and 206, multiplexers 234 and 236 receive, at third "bypass" inputs thereof, bus 228. This bypass connection permits RISC CPU 112 to respond to an instruction using the results of an immediately prior instruction, before those results have been stored into the appropriate location in register file 220, thus reducing the latency of execution of sequences of instructions in which instructions use the results computed by immediately preceding instructions. Watchdog logic circuit 312 interacts with controller 208 to use the bypass connection where needed to reduce latency of execution, as elaborated in further detail below.

Referring now to FIG. 2B, the outputs of registers OPR1 238 and OPR2 240 are delivered to a number of components of RISC CPU 112, via busses 239 and 241, respectively. These components will now be discussed.

As noted above, a first component is the arithmetic/logic unit ALU 242. ALU 242 has a first input connected to bus 239 through which ALU 242 receives the output of the OPR1 register 238. ALU 242 also has a second input connected to bus 241 through which ALU 242 receives the output of the OPR2 register 240.

ALU 242 includes combinational logic for performing arithmetic operations on the two operands delivered thereto via busses 239 and 241, to produces a result on bus 244. The particular operation to be performed by ALU 242 is determined by control signals, derived from a current instruction, delivered to ALU 242 from controller 208 over lines 210. ALU 242 includes circuitry for performing digital subtraction, addition, and sign change operations on the operands received on busses 239 and 241, in response to ADD, SUB, SUBI and CMPI instructions received by controller 208. The specific operations performed by ALU 242 in response to these instructions are identified in the instruction table provided below. When an arithmetic operation is performed by ALU 242, ALU 242 identifies underflow conditions (where the result is negative) and zero conditions (where the result of an operation is zero) resulting from the arithmetic operation, and produces a CONDITIONS signal on lines 245 identifying these conditions. The CONDITIONS signal on lines 245 is delivered to controller 308, and used by controller 308 when executing any one of the branch instructions BN, BZ, BP, BNP, BNZ and BNN identified in the following instruction table, and discussed below with reference to FIG. 5A. In this way, conditional branches can be readily incorporated into the program stored in instruction memory 114 for handling underflow and zero conditions.

ALU 242 also includes circuitry for performing logic manipulations such as a bit-wise AND, bit-wise OR or bit-wise XOR of the operands received on busses 239 and 241, in response to AND, OR and XOR instructions received by controller 208.

A further function provided by ALU 242, is a function for setting or clearing a specific single bit of an operand provided to ALU 242. Specifically, ALU 242 is responsive to a SETF instruction to produce an output equal to the 32-bit operand received by ALU 242 via input bus 239, with a specific bit set to a "1" value. Furthermore, ALU 242 is responsive to a RESETF instruction to produce an output equal to the 32-bit operand received by ALU 242 via input bus 239, with a specific bit set to a "0" value. For either operation, the specific bit to be set or cleared is identified by the five least significant bits received by ALU 242 via input bus 241.

The SETF and RESETF functionality provided by ALU 242 is extremely useful in digital audio/video processing or other environments where the software controlling RISC CPU 112 uses one or more registers as a collection of flag bits, to track the state of the software or operations being performed thereby. In a conventional CPU, to set or clear a specific bit of a flag register, it is necessary to deliver a "mask" to a register in the CPU (typically using one or more instructions to deliver an immediate value into the register), and then use a bitwise-AND or bitwise-OR function of the ALU to set or reset one or more specific bits of the flag register. In accordance with principles of the present invention, the multiple instructions to generate a mask, and the subsequent AND or OR instructions using this mask, are eliminated, in favor of a single SETF or RESETF instruction. This substantially simplifies the task of preparing software for RISC CPU 112, enhances the speed of the software, and makes better use of space in the register file. Further details on the execution of the SETF and RESETF instructions by RISC CPU 112 are provided below with reference to FIGS. 6A and 6 B.

A second component of RISC CPU 112 which receives the output of the OPR1 and OPR2 registers 238 and 240, is a 32-bit barrel shifter 246. Barrel shifter 246 receives a 32-bit signal from bus 241, and a 5-bit shift count from bus 239, as part of the execution of a SHI instruction. (The 32-bit signal from bus 241 is typically obtained from one of the 64 registers in register file 220, and the 5-bit shift count from bus 239 is either an immediate value obtained directly from the instruction in register 200, or is obtained from register 0, as detailed in the instruction table.) Barrel shifter 246 responds to these inputs by producing a 32-bit output signal on bus 248 which is a shifted version of the 32-bit input signal received from bus 241. Barrel shifter 246 is capable of shifting left from 1 to 15 bits, and shifting right from 1 to 16 bits, based on the shift count delivered from bus 239. (The specific shift produced by various 5-bit shift counts is identified in the instruction table which follows.) Barrel shifter 246 also produces CONDITIONS signals on lines 245 indicating various conditions of the results of the shifting operation.

Further components connected to bus 239 are used in retrieving or storing data to and from RBUS registers and locations in DRAM via the GBUS. Specifically, a multiplexer 250 connected to bus 239, responds to an IN, OUT or OUTI instruction by delivering the signals on bus 239 to bus 260. As described in further detail below, the IN, OUT and OUTI instructions are used to store and retrieve information in RBUS registers. Storage or retrieval of data via the RBUS begins by delivering a request to RBUS controller 124 (FIG. 1) identifying the register to which data should be stored or from which data is to be retrieved. When an IN, OUT or OUTI instruction is executed, the less significant bits of the address of an RBUS register to be read or written are delivered to bus 239. The most significant bit of the address of the RBUS register is determined from the current value stored in a bank flip-flop 258. Multiplexer 250 responds to control signals on lines 210 from controller 208, to convert the address obtained from bus 239 and bank flip-flop 258, to a complete RBUS access request on bus 260, requesting that data be delivered from the identified RBUS register to RISC CPU 112, or data be delivered from RISC CPU 112 to the identified RBUS register, as appropriate. The signals on bus 260 connect via a buffer 270 to an RBUS request line 272 which leads to the RBUS controller 124 (FIG. 1), so that RBUS controller responds in the appropriate manner.

As noted above, the most significant bit of the address of an RBUS register to be addressed, is stored in a bank flip-flop 258. The single bit stored in flip-flop 258 is referred to as a "bank" bit, since it identifies which of two banks of RBUS registers that will be addressed by IN, OUT or OUTI instructions. Bank flip-flop 258 may be set or reset in response to command signals generated by controller 208 on lines 210. As seen in the table set forth below, the instruction set supported by RISC CPU 112 includes a BS0 instruction and a BS1 instruction, which respectively clear and set the bank flip-flop 258. Software for RISC CPU 112 uses the BS0 and BS1 instructions prior to IN, OUT or OUTI instructions to ensure that the IN, OUT and OUTI instructions address the appropriate bank of RBUS registers.

Multiplexer 250 has a second and third input on busses 254 and 256. The input signal on bus 254 indicates an address DEC_VALUE, which is the address of an RBUS register in the video layer decoder (VLD) 104, into which the VLD stores status information regarding the state of VLD 104. Multiplexer 250 responds to an INVLD instruction by delivering the DEC_VALUE address to as part of a read command to bus 260, thereby causing data to be read from the DEC_VALUE RBUS register and delivered to the RISC CPU. The input signal on bus 256 indicates an address VLD_CMD, which is the address of an RBUS register in the video layer decoder (VLD) 104, into which commands to the VLD are delivered. Multiplexer 250 responds to an OUTVLD or OUTVLDI instruction by delivering the VLD_CMD address as part of a write command to bus 260, thereby causing data to be written to the VLD_CMD RBUS register. The provision of separate INVLD, OUTVLD and OUTVLDI instructions simplifies the process of preparing software for RISC CPU 112, since the software in RISC CPU 112 must make frequent communications with the video decoder in particular to manage operations of ASIC 100. Further details on the execution of IN, OUT, OUTI, INVLD, OUTVLD and OUTVLDI commands are provided in FIGS. 4A and 4 B, discussed below.

An additional component connected to bus 239, is a memory control logic block 252. This block responds to control signals on lines 210 from controller 208, when a LD (load) or ST (store) instruction is executed by RISC CPU 112. When either a LD or ST instruction is executed, data is sent for storage to DRAM via the GBUS, or data is retrieved from DRAM via the GBUS. In either case, the address in DRAM in which data is to be read or written, is delivered via bus 239 to logic block 252. Logic block 252 converts the address received via bus 239 to an appropriate address for accessing memory.

It will be noted that RISC CPU 112 includes a 256 word, 32-bit wide scratchpad memory 310. This scratchpad memory is used for storage of frequently-accessed data, instead of using locations in DRAM. The use of scratchpad memory substantially reduces the access time for memory locations in the scratchpad. A main function of memory control logic block 252, is to determine whether a particular memory address identified on bus 239, refers to a memory location in DRAM or to a location in scratchpad memory 310.

As is elaborated in substantially greater detail in the above-referenced U.S. Patent Application, a DRAM access request is a 32-bit word, including a 24-bit base address and an 8-bit "count" section. The base address and count identify one or a block of locations in memory to be accessed in response to the request. Memory controller 122 converts a memory access request into physical address(es) in memory 120, and provides access to these locations in memory 120 to the requesting functional unit.

Memory control logic block 252 determines whether a 32-bit memory access request on bus 239 is directed to the DRAM or to scratchpad 310, based on the two most significant bits of the base address identified by the request (i.e., bits 22 and 23 of the 24-bit base address). When the two most significant bits of the base address have a particular value, control logic block 252 determines that the access request is directed to scratchpad 310, and accordingly directs the corresponding address to scratchpad 310 over bus 253. When the two most significant bits of the base address have any other value, control logic block 252 determines that the access request is directed to DRAM, and accordingly forwards the corresponding address/count signals to bus 274. The signals on bus 274 connect via a buffer 276 to a GBUS request bus 280, which leads to the memory controller 122 (FIG. 1), so that memory controller responds by accessing the appropriate location in DRAM 120.

For the purpose of loading and storing data in register file 220, memory access requests delivered to memory controller 122 request access to a single 32-bit word from DRAM 120, in the manner described below. However, an important additional functionality is available. Specifically, using the address/count format supported by memory controller 122, RISC CPU 112 can use a LD or ST instruction to instruct the transfer of blocks of memory locations from and/or to any functional unit in the ASIC 100. This is particularly useful in that it permits RISC CPU 112 to oversee and manage the flow of blocks of data between functional units as part of video and audio decoding.

Furthermore, using the address/count format supported by memory controller 122, RISC CPU 112 can use a LD or ST instruction to load instructions into instruction memory 114. Specifically, a LD instruction directed to memory controller 112 might direct memory controller 112 to deliver a block of 4096 16-bit instructions stored in DRAM 120, to instruction memory 114. Using an instructions of this kind, the software controlling RISC CPU 112 can implement a paging scheme, swapping pages of, e.g., 1024 16-bit instructions into instruction memory 114 during different phases of processing performed by RISC CPU 112.

Data to be delivered to RBUS registers or locations in DRAM, is delivered over bus 241 from OPR1 register 238. Specifically, data to be delivered to a RBUS register on bus 241 is received at a first input of a multiplexer 282. In response to control signals from controller 208 on lines 210, during execution of an OUT, OUTI, OUTVLD or OUTVLDI instruction, multiplexer 282 delivers the 32-bit data signal received via bus 241 to an RBUS register 284. The data stored in RBUS register 284 is then available for output to the RBUS register identified by the instruction by means described below. Similarly, data to be delivered to a DRAM location over the GBUS, is received from bus 241 at a first input of a multiplexer 288. In response to control signals from controller 208 on lines 210, during execution of a ST instruction, multiplexer 288 delivers the 32-bit data signal received via bus 241 to a GBUS register 290. The data stored in GBUS register 290 is then available for output to the DRAM location identified by the instruction by means described below.

Once data is loaded in the RBUS register 284, the data is delivered from RBUS register 284 to bus 286. Bus 286 connects to a RBUS interface circuit 302, which responds to control signals from RBUS 142, to deliver the 32-bit signal on bus 286 to the RBUS for storage in the appropriate register, under control of the RBUS controller 124 (FIG. 1). Similarly, once data is loaded in the GBUS register 290, the data is delivered from GBUS register 290 to bus 292. Bus 292 connects to a GBUS interface circuit 304, which responds to control signals from memory controller 122 (FIG. 1) to deliver the 32-bit signal on bus 292 to the GBUS for storage in the appropriate location in DRAM.

RBUS register 284 and GBUS register 290 are also used to store data received from the RBUS and GBUS. Specifically, RBUS interface circuit 302 is responsive to control signals from RBUS controller 124, to receive data requested through the use of an IN or INVLD instruction, and deliver this data via multiplexer 282 to RBUS register 284. As described below in further detail, after an IN or INVLD instruction has been executed, control signals from controller 208 on lines 210 cause multiplexer 282 to deliver signals from RBUS interface circuit 302 to RBUS register 284, so that when the requested data is delivered from the location identified by the IN or INVLD instruction, the data is stored in RBUS register 284. Once RBUS register 284 has been filled with incoming data from RBUS interface circuit 302, RBUS register 284 generates an IN/OUT READY signal on line 285, indicating that the data is ready to be delivered to the appropriate register in register file 220 by means discussed below. Similarly, GBUS interface circuit 304 is responsive to control signals from memory controller 122, to receive data requested through the use of a LD instruction, and deliver this data via multiplexer 288 to GBUS register 290. As described below in further detail, after a LD instruction has been executed, control signals from controller 208 on lines 210 cause multiplexer 288 to deliver signals from GBUS interface circuit 304 to GBUS register 290, so that when the requested data is delivered from the location identified by the LD instruction, the data is stored in GBUS register 290. Once GBUS register 290 has been filled with incoming data from GBUS interface circuit 304, GBUS register 290 generates a LD/ST READY signal on line 291, indicating that the data is ready to be delivered to the appropriate register in register file 220 by means discussed below.

Data produced by the various functional units described above, is delivered on busses 244, 248, 286 and 292 to a 32-bit multiplexer 300. Multiplexer 300 responds to control signals from controller 208 on lines 210 to deliver input signals on one of these four busses to bus 228, from which the signals may be stored in a selected register of register file 220 (see FIG. 2A). Thus, the results of a computation by ALU 242, a bit shift operation by shifter 246, or incoming data from the RBUS or GBUS in registers 284 and 290, can be selectively delivered to bus 228 for storage in an appropriate location in register file 220.

Returning now to FIG. 2A, as noted in the foregoing, a watchdog circuit 312 monitors operations of RISC CPU 112. Specifically, as noted above, whenever an IN or INVLD instruction is executed by RISC CPU 112, the src1 argument to the instruction is stored into IN ADDR register 226, so that this address can be used later to store the data returned from the RBUS. If a subsequent instruction attempts to access src1, before the data is returned from the RBUS, watchdog circuit 312 stalls operation of the RISC CPU 112 until the data is returned from the RBUS. Similarly, whenever a LD instruction is executed by RISC CPU 112, the src1 argument to the instruction is stored into LD ADDR register 224. If a subsequent instruction attempts to access src1, before the data is returned from DRAM via the GBUS, watchdog circuit 312 stalls operation of the RISC CPU 112 until the data is returned from the GBUS.

To achieve these functions, watchdog circuit 312 compares the addresses (if any) stored in the LD ADDR register 224 and IN ADDR register 226, to arguments of instructions delivered over busses 204 and 206. Watchdog circuit 312 receives control signals from controller 208 on lines 210 indicating whether either or both of busses 204 and 206 are identifying a register address from which data will be read. If a register address identified on bus 204 or bus 206 identifies same register address as the register address stored in IN ADDR register 226 or LD ADDR register 224, watchdog circuit 312 generates a STALL signal on line 318, which is delivered to controller 208 and causes controller 208 to stall fuirther execution of the program.

Watchdog circuit 312 is also responsible for interrupting operations of controller 208 to cause controller 208 to receive data when it is ultimately delivered to RISC CPU 112 in response to an earlier LD, IN or INVLD instruction. Specifically, watchdog circuit 312 receives the IN/OUT READY signal on line 285 as well as the LD/ST READY signal on line 291. If the IN/OUT READY signal is asserted on line 285 while a register address is stored in the IN ADDR register 226, this indicates that data has been returned in response to a previously-executed IN or INVLD instruction and should be delivered to register file 220. Therefore, in this instance, an IN INTERRUPT signal is generated by watchdog logic 312 on line 313, which is delivered to controller 208 to cause controller 208 to interrupt after the current instruction, and store the data found in RBUS register 284 into the address in register file 220 identified by the contents of the IN ADDR register 226, and then clear the IN ADDR register 226. Similarly, if the LD/ST READY signal on line 291 is asserted while a register address is stored in the LD ADDR register 224, this indicates that data has been returned in response to a previously-executed LD instruction and should be delivered to register file 220. Therefore, in this instance, a LD INTERRUPT signal is generated by watchdog logic 312 on line 315, which is delivered to controller 208 to cause controller 208 to interrupt after the current instruction, and store the data found in GBUS register 290 into the address in register file 220 identified by the contents of the LD ADDR register 224, and then clear the LD ADDR register 224.

Watchdog logic 312 is also responsible for controlling execution of LD and ST instructions and IN, OUT, OUTI, OUTVLD, OUTVLDI instructions so that data in the RBUS and GBUS registers is not unintentionally overwritten. Specifically, whenever there is data in the RBUS register 284 as a result of a previously-executed OUT, OUTI, OUTVLD or OUTVLDI instruction, the IN/OUT READY signal on line 285 will be asserted. In this situation, watchdog logic 312 will generate a STALL signal to controller 308 whenever control signals on lines 210 from controller 308 indicate that a subsequent IN, OUT, OUTI, OUTVLD or OUTVLDI instruction has been received from program memory 114. This prevents the subsequent instruction from unintentionally overwriting data in the RBUS register 284 pending delivery via RBUS interface 302. Similarly, whenever there is data in the GBUS register 290 as a result of a previously-executed ST instruction, the LD/ST READY signal on line 291 will be asserted. In this situation, watchdog logic 312 will generate a STALL signal to controller 308 whenever control signals on lines 210 from controller 308 indicate that a subsequent LD or ST instruction has been received from program memory 114. This prevents the subsequent instruction from unintentionally overwriting data in the GBUS register 290 pending delivery via GBUS interface 304.

Watchdog logic 312 also monitors the status of LD ADDR register 224 and IN ADDR register 226 to prevent register addresses in these registers from being unintentionally overwritten. Specifically, whenever there is an address in LD ADDR register 224 (i.e., the register is not cleared), this indicates that data is pending delivery from a DRAM via the GBUS; in this circumstance, watchdog logic 312 will generate a STALL signal to controller 308 whenever control signals on lines 210 from controller 308 indicate that a subsequent LD instruction has been received from program memory 114. This prevents the subsequent instruction from unintentionally overwriting the address in the LD ADDR register 224. Similarly, whenever there is an address in IN ADDR register 226 (i.e., the register is not cleared), this indicates that data is pending delivery from an RBUS register; in this circumstance, watchdog logic 312 will generate a STALL signal to controller 308 whenever control signals on lines 210 from controller 308 indicate that a subsequent IN or INVLD instruction has been received from program memory 114. This prevents the subsequent instruction from unintentionally overwriting the address in the IN ADDR register 226.

Watchdog logic 312 performs a second function, related to the bypass connections from bus 228 to multiplexers 234 and 236, discussed above. Specifically, RISC CPU 112 includes a last write register 314, which responds to control signals from controller 208 on lines 210, to store the register address of the last register to which data was written. The contents of the last write register 314 is delivered to watchdog logic 312. Watchdog logic 312 compares the register address in the last write register 312 to the addresses of registers being read by a current instruction, as identified on busses 204 and 206 as discussed above. If the address identified by the last write register 312 is identical to the address of a register being read by a current instruction, watchdog circuit 312 generates a bypass signal to multiplexer 234 or multiplexer 236, so that the results of the previous computation found on lines 228 are delivered via multiplexer 234 or 236 directly into the appropriate OPR1 or OPR2 register for use in the subsequent computation. (Specifically, if the contents of last write register 314 equal the address signal on bus 204, a BYPASS1 signal is delivered to multiplexer 234. If the contents of last write register 314 equal the address signal on bus 206, a BYPASS2 signal is delivered to multiplexer 236. ) As noted above, the use of this bypass capability eliminates delays that would otherwise be needed to permit data from prior computations to be written into register file 220 before use in subsequent computations.

Referring now to FIGS. 3A–5 B, the use of the circuitry described in FIG. 2 in executing instructions can be explained, in the form of flow charts. While the various operations identified in this and the subsequent flow charts are shown as proceeding in a sequence, it will be appreciated that many of the functions identified are performed in parallel by the hardware of RISC CPU.

Figure 3A:
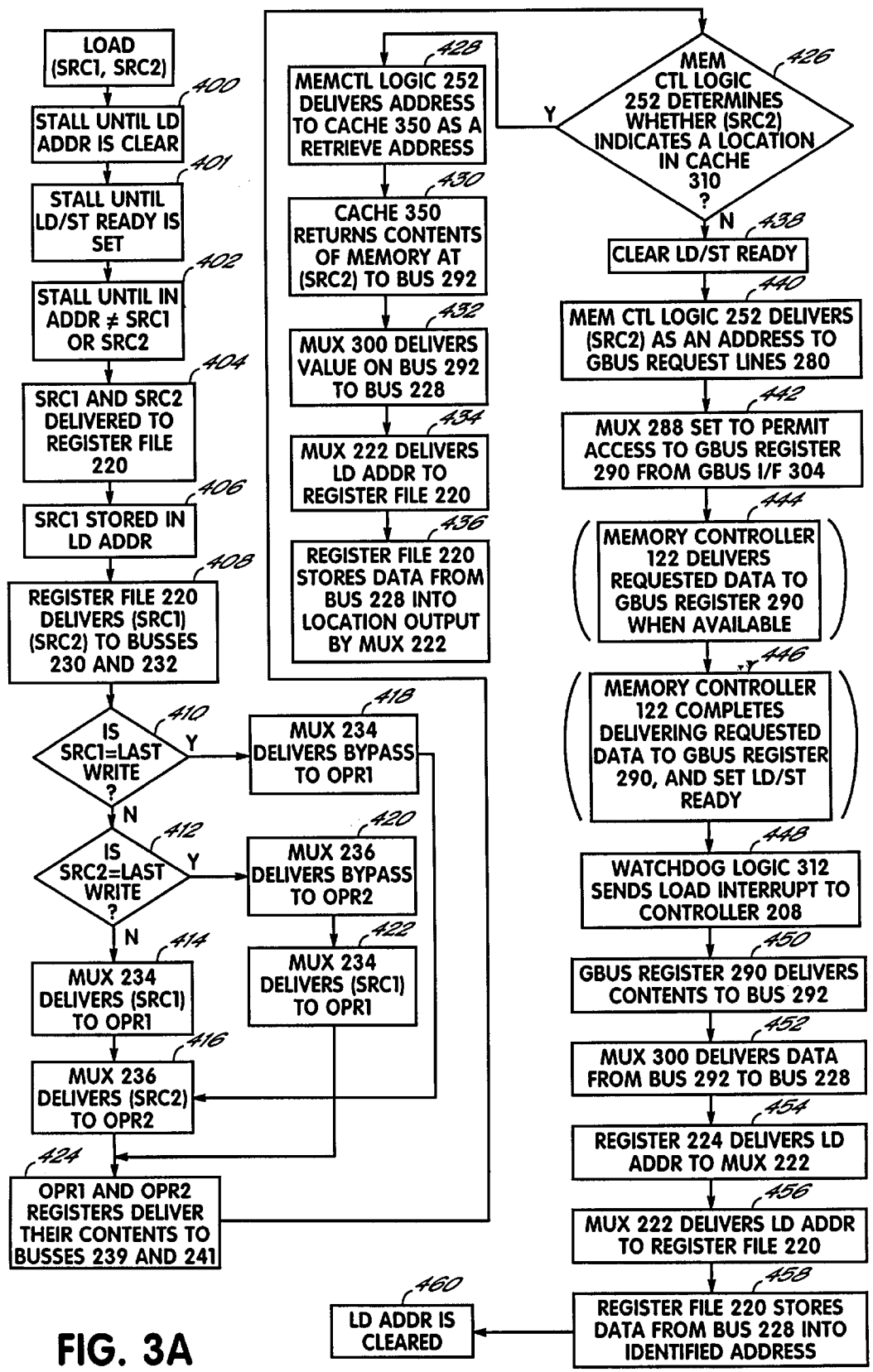
FIG. 3A is a flow chart of operations performed by the RISC CPU of FIG. 2 in responding to a LOAD instruction for loading data into the RISC CPU from DRAM.

Referring to FIG. 3A, the execution of a LD(src1,src2) instruction can be explained. As described in the following table, this instruction causes a data in a DRAM location identified by the contents of a register addressed by operand src2 to be stored into a register addressed by operand src1. In a first step 400, watchdog circuit 312 stalls CPU 112 until LD ADDR register 224 is clear. In step 401, watchdog circuit 312 stalls CPU 112 until the LD/ST ready signal on line 291 is set. Also, in step 402, watchdog circuit 312 stalls CPU 112 if the address identified by IN ADDR register 226 is equal to the src1 or src2 address identified by the instruction. After these steps, in step 404 the src1 and src2 operands are delivered to register file 220 (src1 being delivered via multiplexer 222 ). At the same time, in step 406, src1 is stored in the LD ADDR register 224. Some time thereafter, the contents of the two addressed registers (src1) and (src2) are delivered from register file 220 to busses 230 and 232.

In the following steps, watchdog circuit 312 interacts with the last write register 314 to activate a bypass connection, if necessary. As seen in steps 410 and 412, the address in the last write register 314 is compared to the src1 and src2 operands. If neither operand addresses the same location as the last write register 314, CPU 112 proceeds to step 414, in which multiplexer 414 delivers (src1) from register file 220 to OPR1 register 238, and then to step 416 in which multiplexer 414 delivers (src2) from register file 220 to OPR2 register 240.

If, however, the address in the last write register 314 matches the src1 operand, CPU 112 proceeds from step 410 to step 418, in which multiplexer 414 delivers the BYPASS1 signal to multiplexer 234, and then proceeds to step 416. Alternatively, if the address in the last write register 314 matches the src2 operand, CPU 112 proceeds from step 412 to step 420, in which multiplexer 414 delivers the BYPASS signal to multiplexer 236, and then proceeds to step 422, which is identical to step 414.

After these steps, the OPR1 and OPR2 registers contains (src1) and (src2). Accordingly, in step 424, the OPR1 and OPR2 registers deliver (src1) and (src2) to busses 239 and 241. Thereafter, in step 426, the memory control logic 252 determines whether the DRAM address identified by (src2)) indicates a location in scratchpad memory 310 (as determined from the two most significant bits of the base address, as noted above).

If the address (src2) identifies a location in the scratchpad, in step 428 memory control logic 252 delivers the address (src2) to scratchpad 350 as a retrieve address. In response, in step 430, scratchpad 350 delivers the content of the addressed memory location to bus 292. Next, in step 434, multiplexer 300 delivers the signals received from bus 292 to bus 228. Subsequently, in step 434, multiplexer 222 delivers the address stored in the LD ADDR register 224 to register file 220, indicating the address to which the data should be stored. Finally, register file 220 stores the data from bus 228 into the register identified by the address output from LD ADDR register 224.

As the alternative, if at step 426, the address (src2) identifies a location in DRAM, CPU 112 proceeds from step 426 to step 438, in which the LD/ST READY signal on line 291 is cleared, indicating that GBUS register 290 is awaiting delivery of data from the GBUS. Next, in step 440, memory control logic 252 delivers a memory access request incorporating the address (src2) to the GBUS request lines 280 via buffer 276. Finally, in step 442, multiplexer 288 is set to permit access to GBUS register 290 from the GBUS interface circuit 304, so that data returned from memory can be written to GBUS register 290. Thereafter, in step 444, the memory controller 122 (FIG. 1) will respond, after a variable latency period, and deliver the requested information to the GBUS register 290. This activity occurs at an unspecified time, with a delay determined by the demands placed on memory controller 122, and therefore is shown in parentheses. Furthermore, as discussed above, after step 442, controller 208 will proceed to a subsequent instruction, by instructing PC register 221 to sequence to the next location in instruction memory 114. Execution of subsequent instructions will continue without regard to any delay by memory controller 122 in delivering data to GBUS register 290, unless it is necessary to stall execution for reasons discussed above and elaborated more filly below. Eventually, in step 446, memory controller 122 completes delivery of data to GBUS register 290, causing register 290 to set the LD/ST READY flag on line 291.

When the LD/ST READY flag on line 291 is set, this indicates that data is available in GBUS register 290 for retrieval into register file 220. Accordingly, in step 448, watchdog logic 312 sends a LOAD INTERRUPT signal on line 315 to controller 208. In response, in step 450, controller 208 interrupts processing of instructions to generate control signals on lines 210 to store the data in the GBUS register 290 into the appropriate location in register file 220. Specifically, in step 450, GBUS register 290 delivers the data stored therein to bus 292. In step 452, multiplexer 300 delivers data from bus 292 to bus 228. In step 454, LD ADDR register 224 delivers the register address to which the data should be stored, to multiplexer 222. In step 456, multiplexer 222 delivers the load address to register file 220. (At the same time, the load address is stored in the last write register 314. ) In step 458, register file 220 stores the data from bus 228 into the register at the identified address. Finally, in step 460, the LD ADDR register 224 is cleared, to indicate that the data requested by the preceding LD instruction has been received by RISC CPU 112.

Figure 3B:
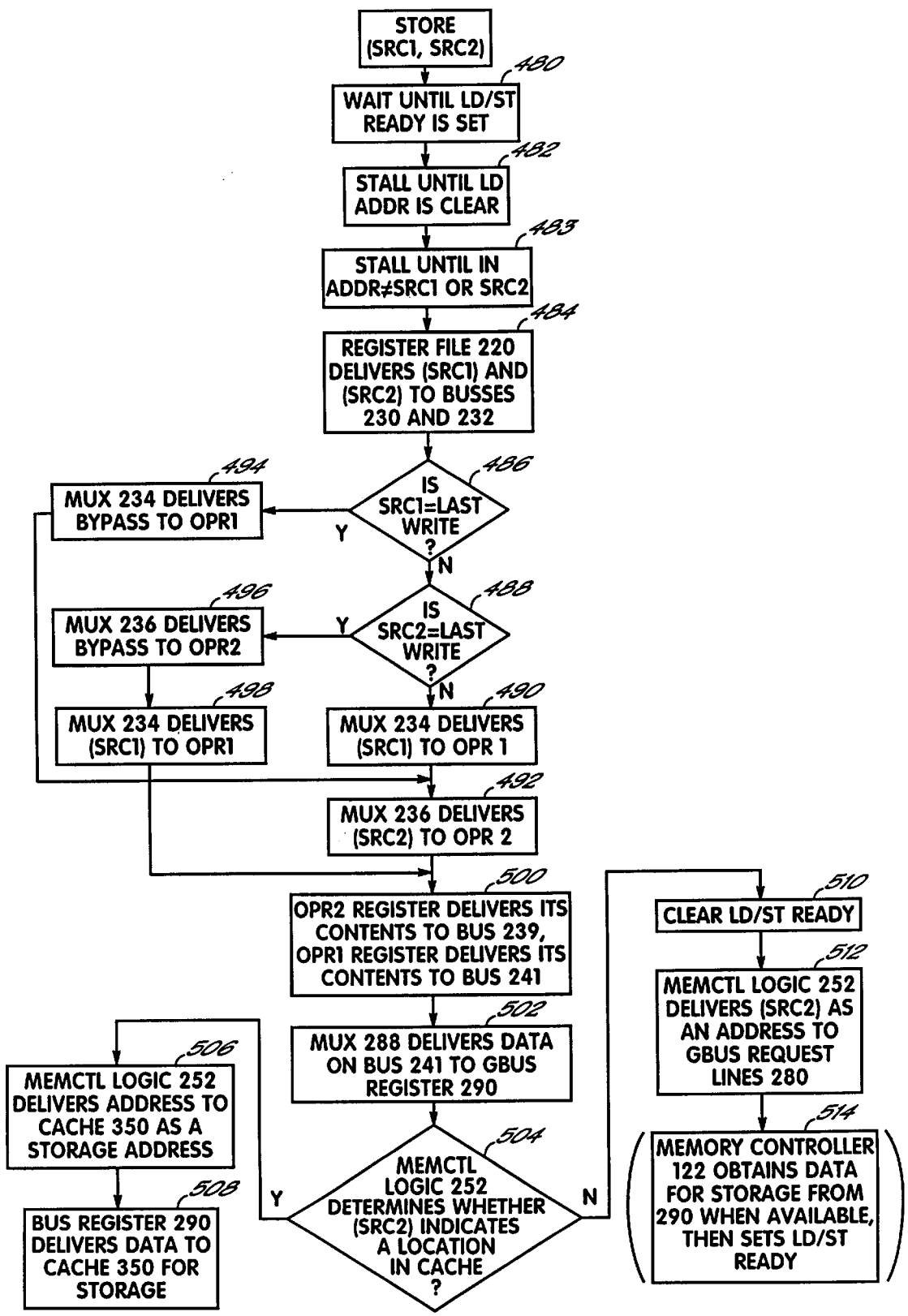
FIG. 3B is a flow chart of operations performed by the RISC CPU of FIG. 2 in responding to a STORE instruction for storing data from the RISC CPU into DRAM.

Referring now to FIG. 3B, the execution of a ST(src1, src2) instruction can be explained. As described in the following table, this instruction causes a 32-bit value found in the register addressed by operand src1, to be stored into a DRAM location identified by the contents of a register addressed by operand src2. Prior to processing this instruction, watchdog logic 312 interacts with controller 308 to stall execution until various conditions are met; specifically, until any prior LD or ST instructions have been completed. To this end, in a first step 480, watchdog logic 312 will generate a STALL signal on line 318 if the LD/ST READY signal on line 291 is clear. If this signal is cleared, this indicates that the execution of a previous ST instruction has placed data into GBUS register 290, and that data is awaiting storage in DRAM. Even if the LD/ST READY signal on line 291 is set, in step 482, watchdog logic 312 will generate a STALL signal if the LD ADDR register 224 is not clear. If the LD ADDR register contains a load address, this indicates that as the result of the execution of a previous LD instruction, GBUS register 290 is awaiting delivery of data from DRAM. In either case, execution of the ST instruction must be stalled until the preceding LD or ST instruction is completed.

Even if LD/ST READY signal is set, and the LD ADDR register 224 is cleared, watchdog logic 312 will generate a STALL signal if either of the registers identified by the src1 or src2 operands of the ST instruction identify registers which are awaiting data from the RBUS. Specifically, watchdog logic 312 will generate a STALL signal if there is an address identified in IN ADDR register 226 which is equal to the address identified by the src1 or src2 operands to the ST instruction.

If the execution of the ST instruction is not stalled as a result of the above conditions, controller 308 proceeds to step 484, and delivers the src1 and src2 operands to register file 220, so that register file 220 delivers (src1) and (src2) to busses 230 and 232. Thereafter, in steps 486 through 498, watchdog logic 312 proceeds to control multiplexers 234 and 236 to deliver this data to the OPR1 and OPR2 registers 238 and 240, by generating BYPASS1 or BYPASS2 signals if necessary. These steps are identical to steps 410 through 422 discussed above with reference to FIG. 3A, and will not be explored further here.

After delivering the operands to the OPR1 and OPR2 registers 238 and 240, in step 500, OPR1 register 238 delivers its contents, i.e., the data to be stored into DRAM, to bus 241 and OPR2 register 240 delivers its contents, i.e., the memory access request to be used, to bus 239. Thereafter, in step 502, multiplexer 288 delivers the data on bus 241 to GBUS register 290 for subsequent delivery to memory. In step 504, memory control logic 252 evaluates the memory access request on bus 239 to determine whether the address identifies a location in scratchpad memory 310, by assessing the two most significant bits of the base address in the memory access request.

If the memory access request is directed to scratchpad memory 310, in step 506 memory control logic 252 delivers the appropriate address to scratchpad 350. At the same time, GBUS register 290 delivers the data to bus 292 for storage in scratchpad 350, and in step 508, scratchpad 350 stores the data into the addressed location.

If, however, the memory access request is directed to a DRAM location, after step 504, in step 510, the LD/ST READY signal on line 291 is cleared, indicating that GBUS register 290 will be unavailable until the data is read therefrom into DRAM. At the same time, memory control logic 252 delivers the memory access request on bus 239 to the GBUS request lines 280 via buffer 276. Thereafter, in step 514, memory controller 122 will, when it is available, obtain data for storage from GBUS register 290. This activity occurs at an unspecified time, with a delay determined by the demands placed on memory controller 122, and therefore is shown in parentheses. Furthermore, as discussed above, after step 512, controller 208 will proceed to a subsequent instruction, by instructing PC register 221 to sequence to the next location in instruction memory 114. Execution of subsequent instructions will continue without regard to any delay by memory controller 122 in obtaining data from GBUS register 290, unless it is necessary to stall execution for reasons discussed above and elaborated more fully below. Once the data has been retrieved by memory controller 122, the LD/ST READY signal on line 291 is set, indicating that GBUS register 290 is again available.

Figure 4A:
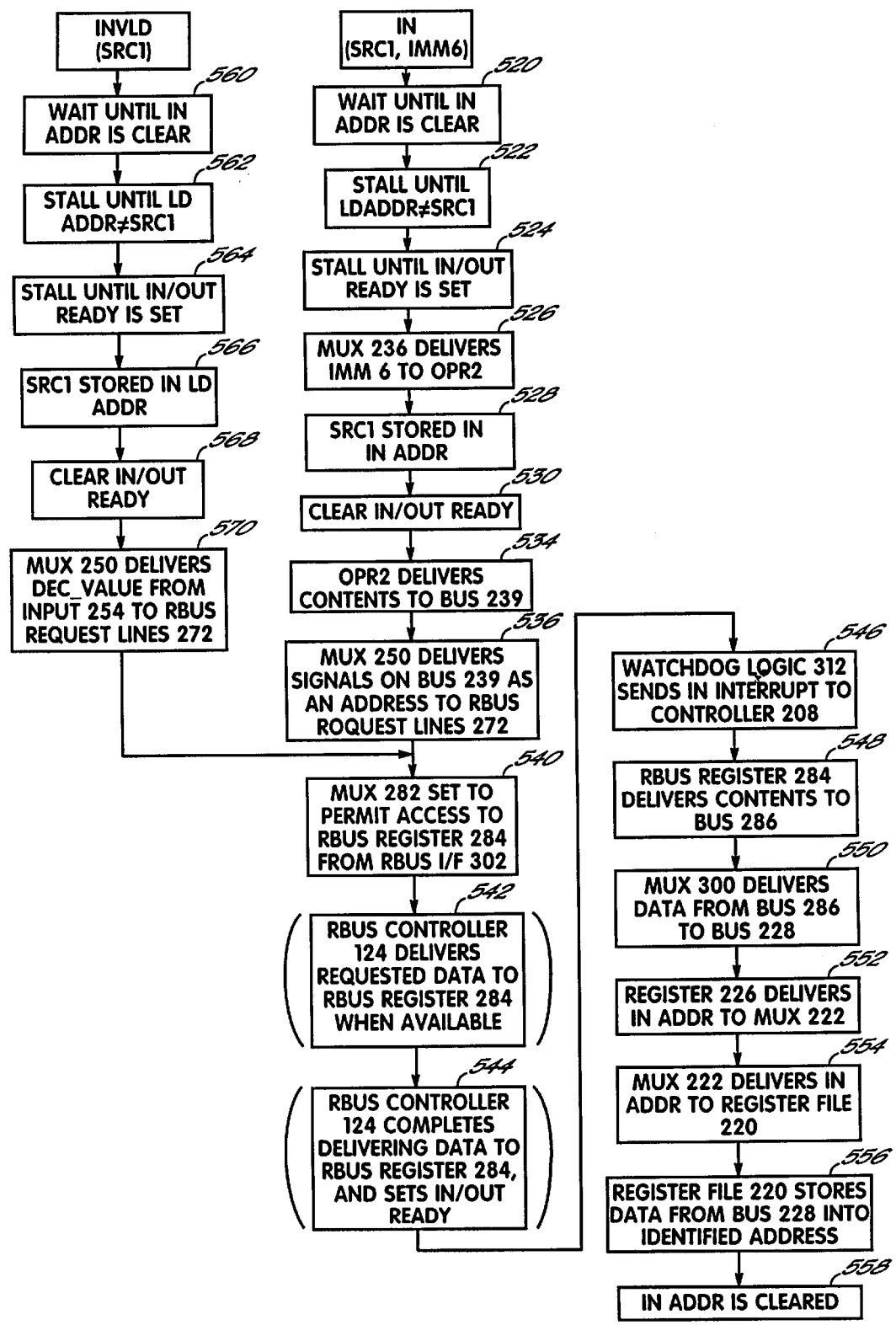
FIG. 4A is a flow chart of operations performed by the RISC CPU of FIG. 2 in responding to an IN or INVLD instruction for storing data from control registers on the RBUS of the ASIC into the RISC CPU.

Referring to FIG. 4A, the execution of an IN(src1,imm6) instruction can be explained. As described in the following table, this instruction causes a data in a RBUS register (in the current bank) identified by the operand imm6, to be stored into a register addressed by operand src1. In a first step 520, watchdog circuit 312 stalls CPU 112 until IN ADDR register 226 is clear. In step 522, watchdog circuit 312 stalls CPU 112 if the address identified by LD ADDR register 226 is equal to the address identified by the src1 operand of the instruction. In step 524, watchdog circuit 312 stalls CPU 112 if the IN/OUT ready signal on line 285 is cleared. After these steps, in step 526, the imm6 operand is delivered to the OPR2 register 240, via the third connection of multiplexer 236 under command of control signals from controller 208 on lines 210. Also, in step 528, the src1 operand to the instruction is stored in IN ADDR register 226, so that the register address identified by the src1 operand is preserved for later storage of the data returned from the RBUS.

After these steps, the OPR2 register contains imm6. Accordingly, in step 534, the OPR2 register delivers imm6 to bus 239. Thereafter, in step 536, multiplexer 250 converts the signals on bus 239 to an RBUS request, and delivers the request to RBUS request lines 272 via buffer 270. Then, in step 540, multiplexer 282 is set to permit access to RBUS register 284 from the RBUS interface circuit 302, so that data returned from the addressed RBUS register can be written to RBUS register 284. Thereafter, in step 542, the RBUS controller 124 (FIG. 1) will respond, after a variable latency period, and deliver the requested information to the RBUS register 284. This activity occurs at an unspecified time, with a delay determined by the demands placed on RBUS controller 124, and therefore is shown in parentheses. Furthermore, as discussed above, after step 540, controller 208 will proceed to a subsequent instruction, by instructing PC register 221 to sequence to the next location in instruction memory 114. Execution of subsequent instructions will continue without regard to any delay by RBUS controller 124 in delivering data to RBUS register 284, unless it is necessary to stall execution for reasons discussed above and elaborated more fully below. Eventually, in step 544, RBUS controller 124 completes delivery of data to RBUS register 284, causing register 284 to set the IN/OUT READY flag on line 285.

When the IN/OUT READY flag on line 285 is set, this indicates that data is available in RBUS register 284 for retrieval into register file 220. Accordingly, in step 546, watchdog logic 312 sends an IN INTERRUPT signal on line 313 to controller 208. In response, in step 548, controller 208 interrupts processing of instructions to generate control signals on lines 210 to store the data in the RBUS register 284 into the appropriate location in register file 220. Specifically, in step 548, RBUS register 284 delivers the data stored therein to bus 286. In step 550, multiplexer 300 delivers data from bus 286 to bus 228. In step 552, IN ADDR register 226 delivers the register address to which the data should be stored, to multiplexer 222. In step 554, multiplexer 222 delivers the address from IN ADDR register 226 to register file 220. (At the same time, the address from IN ADDR register 226 is stored in last write register 314.) In step 556, register file 220 stores the data from bus 228 into the register at the identified address. Finally, in step 558, the IN ADDR register 226 is cleared, to indicate that the data requested by the preceding IN instruction has been received by RISC CPU 112.

FIG. 4A also illustrates the manner of execution of an INVLD(src1) instruction. As described in the following table, this instruction causes a data in the RBUS register DEC_VALUE to be stored into a register addressed by operand src1. To process this command, in a first step 560, watchdog circuit 312 stalls CPU 112 until IN ADDR register 226 is clear. In step 562, watchdog circuit 312 stalls CPU 112 if the address identified by LD ADDR register 226 is equal to the address identified by the src1 operand of the instruction. In step 564, watchdog circuit 312 stalls CPU 112 if the IN/OUT READY signal on line 285 is clear. As noted above, this stalls the CPU 112 until any previous instructions have completed execution. After these steps, in step 566 the src1 operand to the instruction is stored in IN ADDR register 226, so that the register address is preserved for later storage of the data returned from the RBUS, and in step 568, the IN/OUT READY signal on line 285 is cleared. After these steps, in step 570, multiplexer 250 generates an RBUS request addressing the RBUS register at the address DEC_VALUE, and delivers the request to RBUS request lines 272 via buffer 270. Subsequently, the execution of the INVLD instruction is continues to step 540, discussed above, and is otherwise identical to the processing of the IN instruction as described above.

Figure 4B:
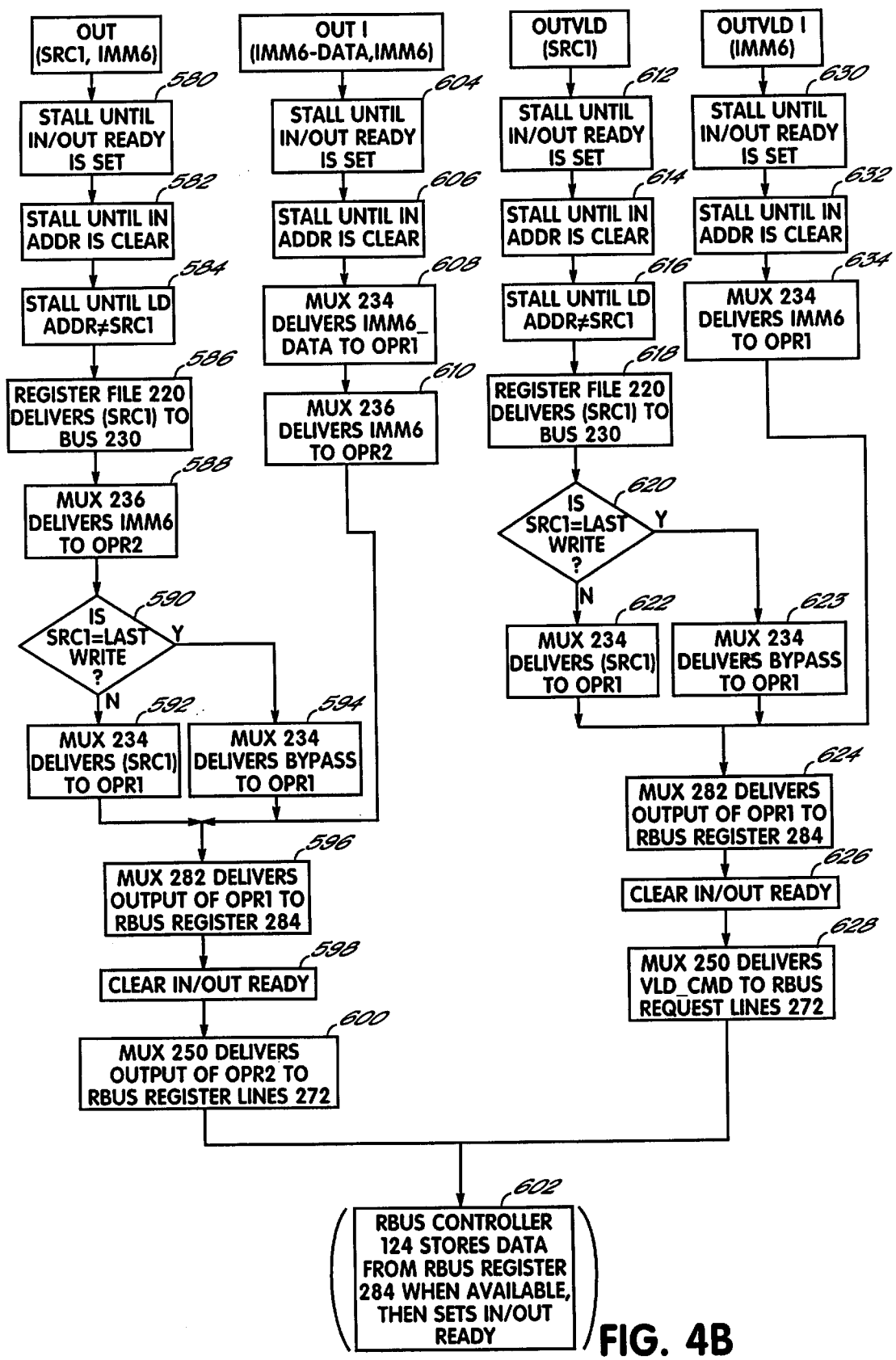
FIG. 4B is a flow chart of operations performed by the RISC CPU of FIG. 2 in responding to an OUT, OUTI, OUTVLD or OUTVLDI instruction for storing data from the RISC CPU into control registers on the RBUS of the ASIC.

Referring to FIG. 4B, the execution of an OUT(src1, imm6) instruction can be explained. As described in the following table, this instruction causes a 32-bit value found in the register addressed by operand src1, to be stored into a RBUS register (in the current bank) identified by operand imm6. Prior to processing this instruction, watchdog logic 312 interacts with controller 308 to stall execution until various conditions are met; specifically, until any prior LD or ST instructions have been completed. To this end, in a first step 580, watchdog logic 312 will generate a STALL signal on line 318 if the IN/OUT READY signal on line 285 is clear. If this signal is cleared, this indicates that the execution of a previous OUT, OUTI, OUTVLD or OUTVLDI instruction has placed data into RBUS register 284, and that data is awaiting storage via the RBUS. Even if the IN/OUT READY signal on line 285 is set, in step 582, watchdog logic 312 will generate a STALL signal if the IN ADDR register 226 is not clear. If the IN ADDR register contains a register address, this indicates that as the result of the execution of a previous IN or INVLD instruction, RBUS register 284 is awaiting delivery of data from the RBUS. In either case, execution of the OUT instruction must be stalled until the preceding IN or OUT instruction is completed. Even if IN/OUT READY signal is set, and the IN ADDR register 284 is cleared, in step 584 watchdog logic 312 will generate a STALL signal if the register identified by the src1 operand of the OUT instruction is awaiting data from the GBUS. Specifically, watchdog logic 312 will generate a STALL signal if there is an address identified in LD ADDR register 224 which is equal to the address identified by the src1 operand to the OUT instruction.

If the execution of the OUT instruction is not stalled as a result of the above conditions, controller 308 proceeds to step 586, and delivers the src1 operand to register file 220, so that register file 220 delivers (src1) to bus 230. At the same time, in step 588, multiplexer 236 delivers the operand imm6 to the OPR2 register 240. Meanwhile, in steps 590 through 594, watchdog logic 312 proceeds to control multiplexer 234 to deliver (src1) to the OPR1 register 238, by generating a BYPASS1 signal if necessary, in the general manner discussed above with reference to FIG. 3A.

After delivering the operands to the OPR1 and OPR2 registers 238 and 240, in step 596, multiplexer 282 delivers the data from OPR1 register 238 to RBUS register 284 for subsequent delivery to the RBUS. Simultaneously, in step 598, the IN/OUT READY signal on line 285 is cleared, indicating that RBUS register 284 will be unavailable until the data is read therefrom via the RBUS. At the same time, in step 600, multiplexer 250 delivers an RBUS request incorporating the address provided from OPR2 register 240, to the RBUS request lines 272 via buffer 270. Thereafter, in step 602, RBUS controller 124 will, when it is available, obtain data for storage from RBUS register 284. This activity occurs at an unspecified time, with a delay determined by the demands placed on RBUS controller 124, and therefore is shown in parentheses. Furthermore, as discussed above, after step 598, controller 208 will proceed to a subsequent instruction, by instructing PC register 221 to sequence to the next location in instruction memory 114. Execution of subsequent instructions will continue without regard to any delay by RBUS controller 124 in obtaining data from RBUS register 284, unless it is necessary to stall execution for reasons discussed above. Once the data has been retrieved by RBUS controller 124, the IN/OUT READY signal on line 285 is set, indicating that RBUS register 284 is again available.

FIG. 4B also illustrates the processing performed in response to an OUTI(imm6_data, imm6) instruction. As described in the following table, this instruction causes an immediate data value in operand imm6_data to be stored in the RBUS register (in the current bank) addressed by operand imm6. To process this command, in a first step 604, watchdog circuit 312 stalls CPU 112 until the IN/OUT READY signal on line 285 is set. As noted above, this stalls the CPU 112 until any previous instructions have completed execution. In step 606, watchdog circuit 312 stalls CPU 112 until IN ADDR register 226 is clear, which insures that no previously pending IN or INVLD instructions are attempting to use RBUS register 284 to receive data.

After these steps, in step 608 the imm6_data operand to the instruction is delivered from bus 204 via multiplexer 234 to OPR1 register 238. At the same time, in step 610, the imm6 operand to the instruction is delivered from bus 206 via multiplexer 236 to OPR2 register 240. After these steps, execution proceeds to step 596, discussed above.

FIG. 4B further illustrates the execution of an OUTVLD (src1) instruction. As described in the following table, this instruction causes a 32-bit value found in the register addressed by operand src1, to be stored into the RBUS register at the address VLD_CMD. Prior to processing this instruction, watchdog logic 312 interacts with controller 308 to stall execution until various conditions are met; specifically, until any prior LD or ST instructions have been completed. To this end, in a first step 612, watchdog logic 312 will generate a STALL signal on line 318 if the IN/OUT READY signal on line 285 is clear. If this signal is cleared, this indicates that the execution of a previous OUT, OUTI, OUTVLD or OUTVLDI instruction has placed data into RBUS register 284, and that data is awaiting storage via the RBUS. Even if the IN/OUT READY signal on line 285 is set, in step 614, watchdog logic 312 will generate a STALL signal if the IN ADDR register 226 is not clear. If the IN ADDR register contains a register address, this indicates that as the result of the execution of a previous IN or INVLD instruction, RBUS register 284 is awaiting delivery of data from the RBUS. In either case, execution of the OUTVLD instruction must be stalled until the preceding IN or OUT instruction is completed. Even if IN/OUT READY signal is set, and the IN ADDR register 284 is cleared, in step 616 watchdog logic 312 will generate a STALL signal if the register identified by the src1 operand of the OUTVLD instruction is awaiting data from the GBUS. Specifically, watchdog logic 312 will generate a STALL signal if there is an address identified in LD ADDR register 224 which is equal to the address identified by the src1 operand to the OUTVLD instruction.

If the execution of the OUT instruction is not stalled as a result of the above conditions, controller 308 proceeds to step 618, and delivers the src1 operand to register file 220, so that register file 220 delivers (src1)to bus 230. Then, in steps 620 through 623, watchdog logic 312 proceeds to control multiplexer 234 to deliver (src1) to the OPR1 register 238, by generating a BYPASS1 signal if necessary, in the general manner discussed above with reference to FIG. 3A.

After delivering the (src1) to the OPR1 register 238, in step 624, multiplexer 282 delivers the data from OPR1 register 238 to RBUS register 284 for subsequent delivery to the RBUS. Simultaneously, in step 626, the IN/OUT READY signal on line 285 is cleared, indicating that RBUS register 284 will be unavailable until the data is read therefrom via the RBUS. At the same time, in step 628, multiplexer 250 delivers an RBUS request incorporating the address VLD_CMD, to the RBUS request lines 272 via buffer 270. Thereafter, as noted above, in step 602, RBUS controller 124 will, when it is available, obtain data for storage from RBUS register 284. After step 628, however, controller 208 will proceed to a subsequent instruction, by instructing PC register 221 to sequence to the next location in instruction memory 114. Execution of subsequent instructions will continue without regard to any delay by RBUS controller 124 in obtaining data from RBUS register 284, unless it is necessary to stall execution for reasons discussed above. Once the data has been retrieved by RBUS controller 124, the IN/OUT READY signal on line 285 is set, indicating that RBUS register 284 is again available.

FIG. 4B also illustrates the processing performed in response to an OUTVLDI(imm6) instruction. As described in the following table, this instruction causes an immediate data value in operand imm6 to be stored in the RBUS register (in the current bank) addressed by VLD_CMD. To process this command, in a first step 630, watchdog circuit 312 stalls CPU 112 until the IN/OUT READY signal on line 285 is set. As noted above, this stalls the CPU 112 until any previous instructions have completed execution. In step 632, watchdog circuit 312 stalls CPU 112 until IN ADDR register 226 is clear, which insures that no previously pending IN or INVLD instructions are attempting to use RBUS register 284 to receive data.

After these steps, in step 634 the imm6 operand to the instruction is delivered from bus 204 via multiplexer 234 to OPR1 register 238. Once the imm6 operand is available in OPR1 register 238, execution proceeds to step 624, discussed above.

Figure 5A:
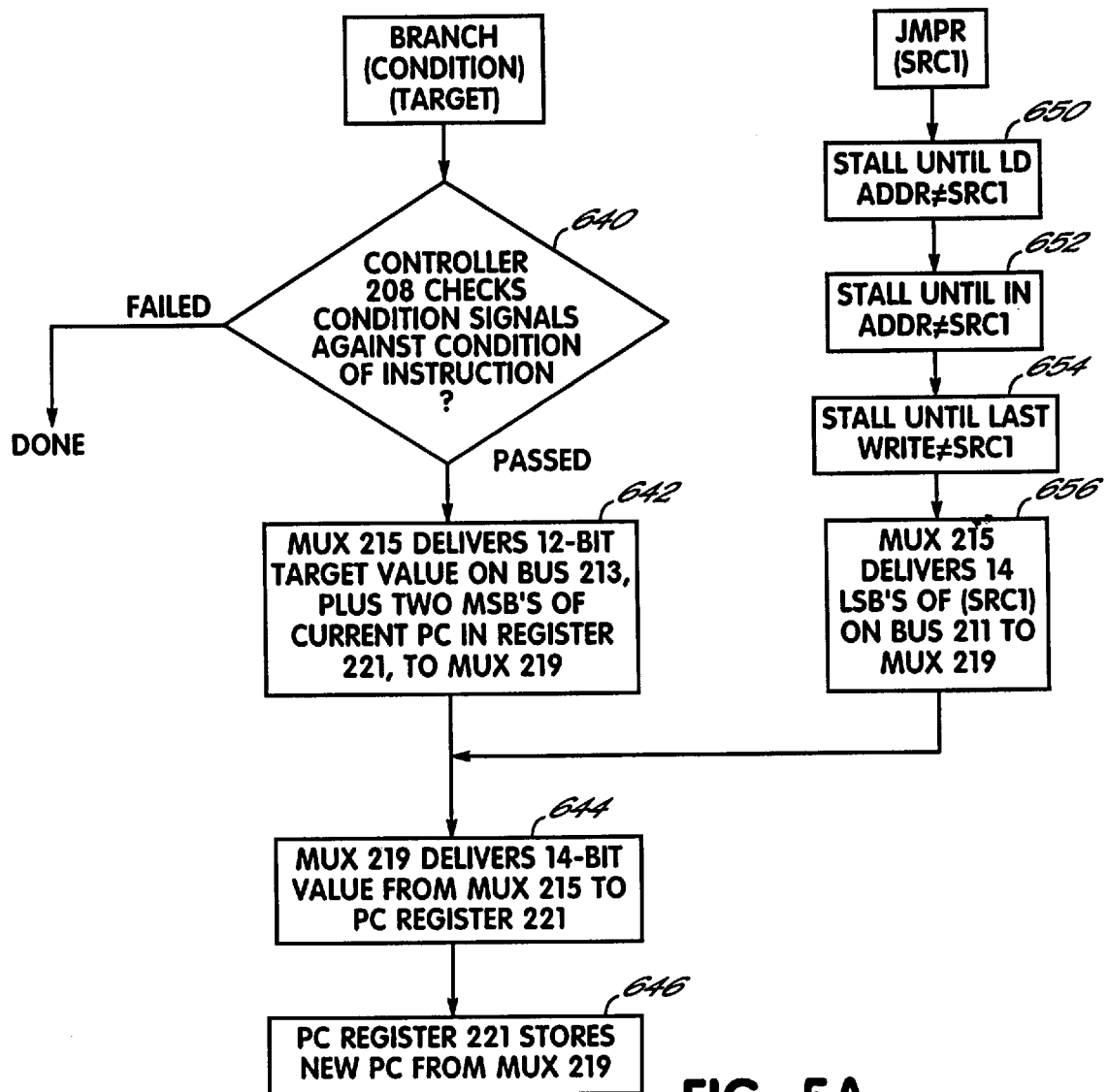
FIG. 5A is a flow chart of operations performed by the RISC CPU of FIG. 2 in responding to a BRANCH or JUMPR instruction for controlling the flow of a program executing in the RISC CPU.

Referring to FIG. 5A, the operations performed in response to a B(target) conditional branch instruction can be discussed. As seen in the following table, the B instructions perform a conditional branch to a new location in the program in instruction memory 114 in response to conditions on lines 245 generated by ALU 242 and shifter 246. Accordingly, in a first step 640 of executing a B instruction, controller 208 compares the condition signals received by controller 208 on lines 245, to the conditions required for the instruction to be activated. If the conditions on lines 245 do not satisfy the requirements for executing the branch (as identified in detail in the following instruction table), processing of the instruction is done. However, if the conditions on lines 245 satisfy the requirements for executing the branch, execution proceeds to step 642, in which multiplexer 215 delivers the 12-bit target value on bus 213 (which is the concatenation of busses 204 and 206), plus the two most significant bits of the current output of PC register 221, to multiplexer 219. Then in step 644, multiplexer 219 delivers the 14-bit value generated by multiplexer 215 to the PC register 221. Finally, in step 646, the PC register 221 stores the new program counter from multiplexer 219, and delivers this new value to instruction memory 114, effectively branching execution to the new location in the program.

FIG. 5A also illustrates the execution of a JUMPR(src1) instruction. As indicated in the following table, this instruction branches execution to a location in program memory 114 identified by the contents of a register in register file 220 addressed by the operand src1. As can be seen from the foregoing, the B instructions can only modify the 12 less significant bits of the program counter, and thus can only perform conditional branches within a 1024 instruction space in program memory 114; the JUMPR instruction, on the other hand, can modify all 14 bits of the program counter, and thus can perform a branch to any location in program memory 114.

In response to a JMPR(src1) instruction, watchdog logic 312 will stall execution unless and until the necessary address is available in the register addressed by the operand src1. Specifically, in step 650, watchdog logic 312 will generate a STALL signal on line 318 if the register address stored in LD ADDR register 224 is equal to the register address identified by the argument src1. Similarly, in step 652, watchdog logic 312 will generate a STALL signal on line 318 if the register address stored in IN ADDR register 226 is equal to the register address identified by the argument src1. Further, in step 654, watchdog logic 312 will generate a STALL signal on line 318 if the register address stored in LAST WRITE register 314 is equal to the register address identified by the argument src1.

Assuming the above conditions are met, multiplexer 222 delivers the src1 argument from bus 204 to register file 222, causing register file 222 to deliver (src1) on bus 230. Subsequently, in step 656, multiplexer 215 delivers the 14 least significant bits of (src1), available on bus 211, to multiplexer 215. Execution then proceeds to steps 644 and 646, discussed above, to cause PC register 221 to sequence further program execution to the location in program memory 114 identified by the 14-bit address from bus 211.

Figure 5B:
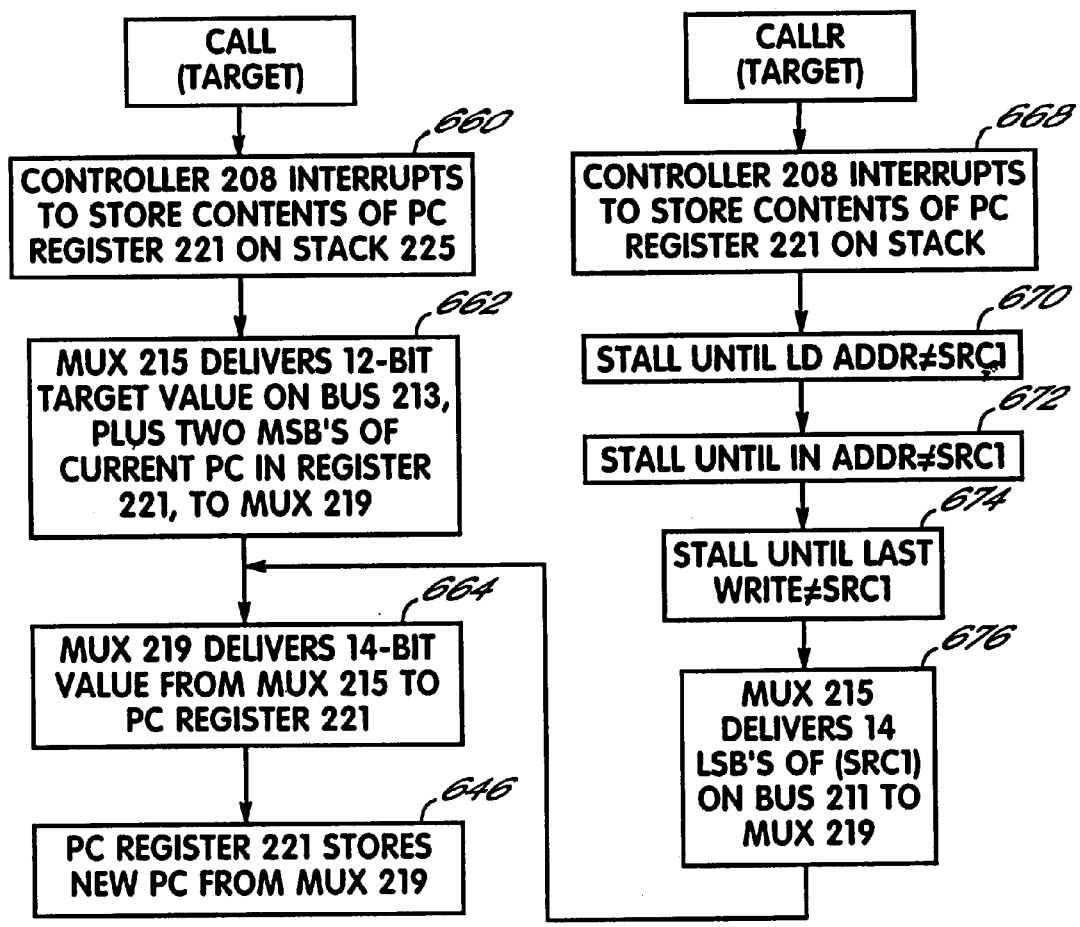
FIG. 5B is a flow chart of operations performed by the RISC CPU of FIG. 2 in responding to a CALL or CALLR instruction for controlling the flow of a program executing in the RISC CPU.

Referring now to FIG. 5B, the operations performed in response to a CALL(target) instruction can be discussed. As seen in the following table, the CALL instruction calls a subroutine at a new location in the in the program in instruction memory 114. At the end of a subroutine entered using a CALL instruction, a RTI instruction (described above) is used to return execution to the next instruction following the CALL instruction. Accordingly, in a first step 660 of executing a CALL instruction, controller 208 issues control signals on lines 210 to PC register 221, causing PC register 221 to push the current value of the PC register into a CALL segment 225b of the stack memory. Next, in step 662, multiplexer 215 delivers the 12-bit target value on bus 213 (which is the concatenation of busses 204 and 206), plus the two most significant bits of the current output of PC register 221, to multiplexer 219. Then in step 664, multiplexer 219 delivers the 14-bit value generated by multiplexer 215 to the PC register 221. Finally, in step 666, the PC register 221 stores the new program counter from multiplexer 219, and delivers this new value to instruction memory 114, effectively sequencing execution to the new location in the program.

FIG. 5B also illustrates the execution of a CALLR(src1) instruction. As indicated in the following table, this instruction calls a subroutine at a location in program memory 114 identified by the contents of a register in register file 220 addressed by the operand src1. As can be seen from the foregoing, the CALL instruction can only modify the 12 less significant bits of the program counter, and thus can only call subroutines within a 1024 instruction space in program memory 114; the CALLR instruction, on the other hand, can modify all 14 bits of the program counter, and thus can perform a branch to any location in program memory 114.

Execution of a CALLR(src1) instruction, begins at a first step 668, in which controller 208 issues control signals on lines 210 to PC register 221, causing PC register 221 to push the current value of the PC register into a CALL segment 225b of the stack memory. After this step, watchdog logic 312 will stall further execution unless and until the necessary address is available in the register addressed by the operand src1. Specifically, in step 670, watchdog logic 312 will generate a STALL signal on line 318 if the register address stored in LD ADDR register 224 is equal to the register address identified by the argument src1. Similarly, in step 672, watchdog logic 312 will generate a STALL signal on line 318 if the register address stored in IN ADDR register 226 is equal to the register address identified by the argument src1. Further, in step 674, watchdog logic 312 will generate a STALL signal on line 318 if the register address stored in LAST WRITE register 314 is equal to the register address identified by the argument src1.

Assuming the above conditions are met, multiplexer 222 delivers the src1 argument from bus 204 to register file 222, causing register file 222 to deliver (src1) on bus 230. Subsequently, in step 676, multiplexer 215 delivers the 14 least significant bits of (src1), available on bus 211, to multiplexer 215. Execution then proceeds to steps 664 and 666, discussed above, to cause PC register 221 to sequence further program execution to the location in program memory 114 identified by the 14-bit address from bus 211.

Figure 6A:
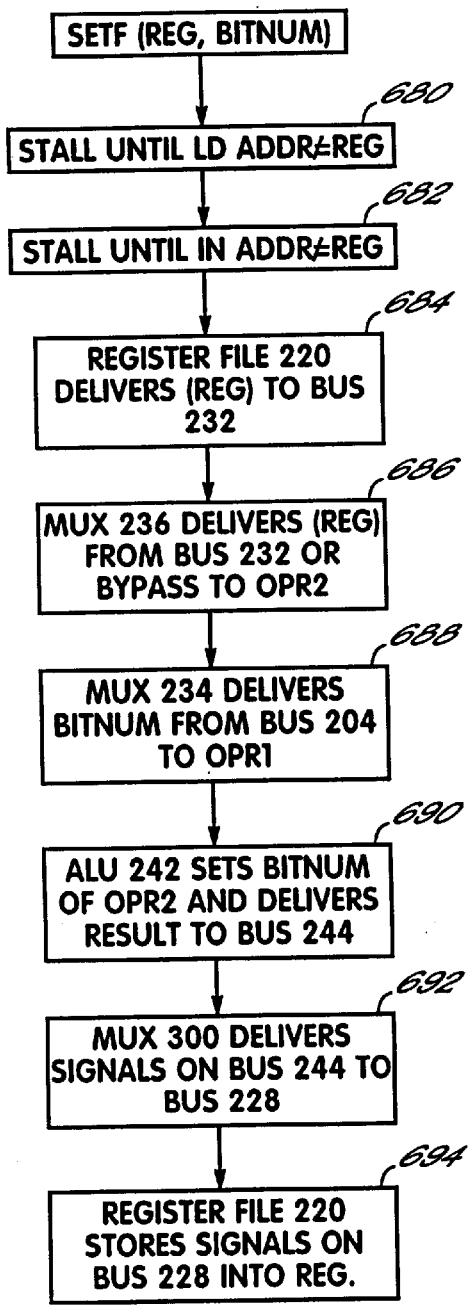
FIG. 6A is a flow chart of operations performed by the RISC CPU of FIG. 2 in responding to a SETF instruction for setting a bit in a register.

Referring now to FIG. 6A, the execution of a SETF(reg, bitnum) instruction can be explained. As indicated in the following instruction table, the SETF instruction sets a specific bit in either register 0 or register 1 of register file 220. The reg operand is a single bit which identifies whether register 0 or register 1 is to be modified, and the bitnum operand identifies which bit of that register is to be modified. As a first step of the SETF instruction, watchdog logic 312 stalls further execution if the identified register is expecting data from an earlier LD or IN instruction. Specifically, in step 680, watchdog logic 312 generates a STALL signal on line 318 if the reg operand of the SETF instruction identifies the same register as the register address in the LD ADDR register 224. Similarly, in step 682, watchdog logic 312 generates a STALL signal on line 318 if the reg operand of the SETF instruction identifies the same register as-the register address in the IN ADDR register 226.

Assuming the above conditions are met, in step 684, multiplexer 236 delivers the contents (reg) of the register of register file 220 identified by the operand reg of the instruction, to bus 232. As part of this step, register file 220 receives a control signal on lines 210 from controller 208, instruction register file 220 to output the contents of register 0 or register 1 to bus 232, as indicated by the reg operand of the SETF instruction. (Controller 208 treats the reg operand as a portion of the opcode of the SETF instruction, and in response thereto generates the appropriate control signals on lines 210 to register file 220.) At the same time, watchdog logic 312 determines whether the register address in last write register 314 identifies the same register as the reg operand of the SETF instruction, and if so, generates a BYPASS2 signal on line 317. Thus, in step 686, multiplexer 236 either delivers the signals on bus 232 to OPR2 register 240, or delivers a value from bus 228 in response to a BYPASS1 signal from watchdog logic 312.

Simultaneously with step 686, in step 688 multiplexer 234 delivers the bitnum operand of the SETF instruction from bus 204 to the OPR1 register 238. Thereafter, in step 690, ALU 242 responds to control signals on lines 210 from controller 208, generates an output signal on bus 244 equal to the input signal received on bus 239, with the bit identified by the signal received on bus 241 set to a "1" value. Subsequently, in step 692, multiplexer 300 delivers the signals on bus 244 to bus 228, and thereafter, in step 694 register file 220 responds to control signals from controller 208 to store the signals on bus 228 into the register identified by the argument reg.

Figure 6B:
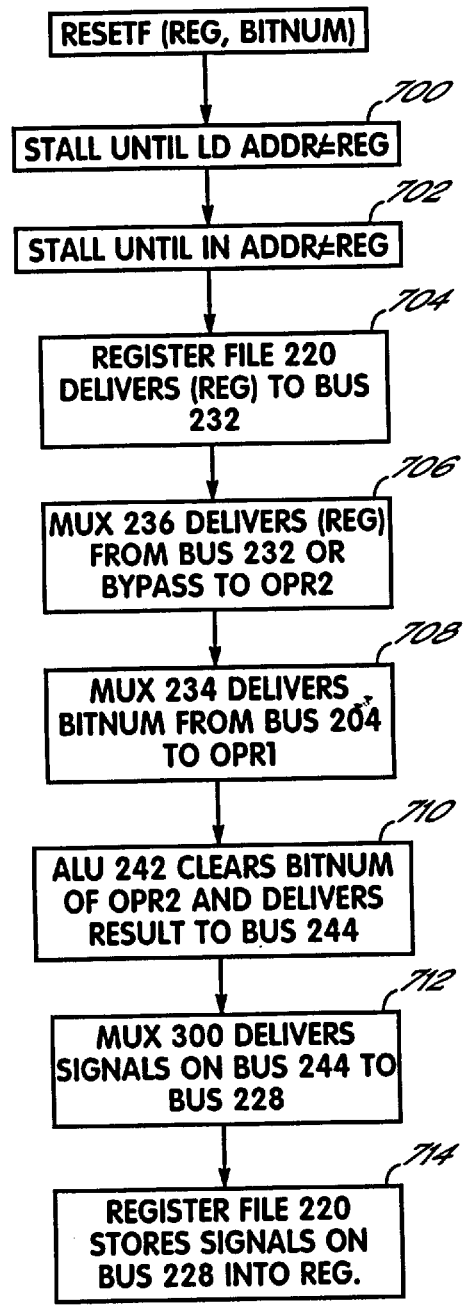
FIG. 6B is a flow chart of operations performed by the RISC CPU of FIG. 2 in responding to a RESETF instruction for clearing a bit in a register.

Referring now to FIG. 6B, the execution of a RESETF (reg,bitnum) instruction can be explained. As indicated in the following instruction table, the RESETF instruction clears a specific bit in either register 0 or register 1 of register file 220. The reg operand is a single bit which identifies whether register 0 or register 1 is to be modified, and the bitnum operand identifies which bit of that register is to be modified. As a first step of the RESETF instruction, watchdog logic 312 stalls further execution if the identified register is expecting data from an earlier LD or IN instruction. Specifically, in step 700, watchdog logic 312 generates a STALL signal on line 318 if the reg operand of the RESETF instruction identifies the same register as the register address in the LD ADDR register 224. Similarly, in step 702, watchdog logic 312 generates a STALL signal on line 318 if the reg operand of the RESETF instruction identifies the same register as the register address in the IN ADDR register 226.

Assuming the above conditions are met, in step 704, multiplexer 236 delivers the contents (reg) of the register of register file 220 identified by the operand reg of the instruction, to bus 232. As part of this step, register file 220 receives a control signal on lines 210 from controller 208, instruction register file 220 to output the contents of register 0 or register 1 to bus 232, as indicated by the reg operand of the RESETF instruction. (Controller 208 treats the reg operand as a portion of the opcode of the RESETF instruction, and in response thereto generates the appropriate control signals on lines 210 to register file 220.) At the same time, watchdog logic 312 determines whether the register address in last write register 314 identifies the same register as the reg operand of the RESETF instruction, and if so, generates a BYPASS 2 signal on line 317. Thus, in step 706, multiplexer 236 either delivers the signals on bus 232 to OPR2 register 240, or delivers a value from bus 228 in response to a BYPASS 1 signal from watchdog logic 312.

Simultaneously with step 706, in step 708 multiplexer 234 delivers the bitnum operand of the RESETF instruction from bus 204 to the OPR1 register 238. Thereafter, in step 710, ALU 242 responds to control signals on lines 210 from controller 208, generates an output signal on bus 244 equal to the input signal received on bus 239, with the bit identified by the signal received on bus 241 cleared to a "0" value. Subsequently, in step 712, multiplexer 300 delivers the signals on bus 244 to bus 228, and thereafter, in step 714 register file 220 responds to control signals from controller 208 to store the signals on bus 228 into the register identified by the argument reg.

The following table summarizes, in one embodiment, the instructions supported by RISC CPU 112, the format of these instructions and the functions performed thereby:

| SYNTAX | OPCODE/ OPERAND(S) | EXECUTION |
| --- | --- | --- |
| add (src1, src2) sub (src1, src2) | 4-bit opcode src1 - 6-bit register address src2 - 6-bit register address | src1 ← (src1) + (src2) src1 ← (src1) + (−src2) If sum or difference is zero, Z condition is set; otherwise Z condition is cleared. If result is negative (underflow) N condition is set; otherwise N condition is cleared. |
| subi (src1, imm6) | 4-bit opcode src1 - 6-bit register address imm6 - 6-bit immediate value | src1 ← (src1) − (src2) If sum or difference is zero, Z condition is set; otherwise Z condition is cleared. If result is negative (underflow) N condition is set; otherwise N condition is cleared. |
| and (src1, src2) or (src1, src2) | 4-bit opcode src1 - 6-bit register address | src1 ← (src1) − (src2) If result is zero, Z condition is set; otherwise Z condition is |

| SYNTAX | OPCODE/OPERAND(S) | EXECUTION |
|---|---|---|
| | src2 - 6-bit register address | cleared. |
| bn (target) | 4-bit opcode<br>target - 12 bit immediate value, substitutes for LSB's of PC (PC bits 0–11) | $PC_{0-11} \leftarrow$ target if CC = N |
| bz (target) | 4-bit opcode<br>target - 12 bit immediate value, substitutes for LSB's of PC (PC bits 0–11) | $PC_{0-11} \leftarrow$ target if CC = Z |
| bp (target) | 4-bit opcode<br>target - 12 bit immediate value, substitutes for LSB's of PC (PC bits 0–11) | $PC_{0-11} \leftarrow$ target if CC = (~N\|Z) |
| bnp (target) | 4-bit opcode<br>target - 12 bit immediate value, substitutes for LSB's of PC (PC bits 0–11) | $PC_{0-11} \leftarrow$ target if CC = (N\|Z) |
| bnz (target) | 4-bit opcode<br>target - 12 bit immediate value, substitutes for LSB's of PC (PC bits 0–11) | $PC_{0-11} \leftarrow$ target if CC = (~Z) |
| bnn (target) | 4-bit opcode<br>target - 12 bit immediate value, substitutes for LSB's of PC (PC bits 0–11) | $PC_{0-11} \leftarrow$ target if CC = (~N) |
| br (target) | 4-bit opcode<br>target - 12 bit immediate value, substitutes for LSB's of PC (PC bits 0–11) | $PC_{0-11} \leftarrow$ target |
| biti (src1, imm4) | 6-bit opcode<br>src1 - 6-bit register address<br>imm4 - 4-bit immediate value | tmp ← ((src1)>>imm4)&0x1<br>Tests value of a bit of src1 at a position identified by imm4. If tested bit is "0", sets Z condition; otherwise, clears Z condition. Temporary register receives bit at position identified by imm4. Src1 is not modified. |
| bs0() | 16-bit opcode | Switch to bank zero of RBUS register space. In this mode the in/out/outi instructions access RBUS register addresses 0x00 to 0x3f. |
| bs1() | 16-bit opcode | Switch to bank zero of RBUS register space. In this mode the in/out/outi instructions access RBUS register addresses 0x40 to 0x7f. |
| call (target) | 4-bit opcode<br>target - 12 bit immediate value, substitutes for LSB's of PC (PC bits 0–11) | $PC_{0-11} \leftarrow$ target<br>Return link stored on stack |
| callr (src1) | 10-bit opcode<br>src1 - 6-bit register address | $PC_{0-13} \leftarrow$ (src1)<br>src1 ← return link |
| cmpi (src1, imm5) | 5-bit opcode<br>src1 - 6-bit register address<br>imm6 - 5-bit immediate binary | tmp ← (src1) − imm5<br>5-bit unsigned immediate value imm5 is subtracted from the contents of the register addressed by src1. The result value is stored in the temporary register. If the difference is zero, Z condition is set; otherwise, Z condition is cleared. If the result is negative, N condition is set; otherwise, N condition is cleared |
| dint()<br>enint()<br>halt() | 16-bit opcode<br>16-bit opcode<br>16-bit opcode | Disable interrupts<br>Enable interrupts<br>Halts the CPU at the current instruction by changing the state of controller 208. Internal state of CPU is preserved so that execution can resume at the current program counter with no side effects. |
| imm16 (imm16[15:6])<br>movi (src1, imm16[5:0]) | imm16 - 6-bit opcode, 10-bit immediate value imm16[15:6]<br>movi - 4-bit opcode, 6-bit register address src1, 6-bit immediate value imm16[5:0] | src1 ← imm16 [15.0]<br>The instruction pair loads a 16 bit unsigned immediate value into register src1. Interrupts are not taken between the two instructions. If value is zero, Z condition is set; otherwise Z condition is cleared. If value is negative (underflow) N condition is set; otherwise N condition is cleared. |
| imm22 (imm22[21:12])<br>movi 0 (imm22[11:0]) | imm22 - 6-bit opcode, 10-bit immediate value imm22[21:12]<br>movi0 - 4-bit opcode, 12-bit immediate value imm22[11:0] | r0 ← imm22[21:0]<br>The instruction pair loads a 22 bit unsigned immediate value into register r0. Interrupts are not taken between the two instructions. If value is zero, Z condition is set; otherwise Z condition is cleared. If value is negative (underflow) N condition is set; otherwise N condition is cleared. |
| in (src1, imm6) | 4-bit opcode<br>src1 - 6-bit register address<br>imm6 - 6-bit immediate value | src1 ← RBUS [imm6]<br>The contents of the RBUS register addressed by imm6 (in current bank) are stored in register src1. |
| invld (src1) | 10-bit opcode<br>src1 - 6-bit register address | src1 ← RBUS [dec_value1]<br>The contents of the rbus register addressed by dec_value1 (VLD results) stored in register src1. |
| jmpr (src1) | 10-bit opcode<br>src1 - 6-bit register address | $PC_{0-13} \leftarrow$ (src1) |
| ld (src1, src2) | 4-bit opcode<br>src1 - 6-bit register address<br>src2 - 6-bit register address | src1 ← DMEM [(src2)]<br>The contents of the DRAM location addressed by (src2) are stored in register src1. |
| mov (src1, src2) | 4-bit opcode<br>src1 - 6-bit register address<br>src2 - 6-bit register address | src1 ← (src2)<br>The contents of register src2 are stored in register src1. If (src2) is zero, Z condition is set; otherwise Z condition is cleared. If (src2) is negative N condition is set; otherwise N condition is cleared. |
| movi (src1, imm6) | 4-bit opcode<br>src1 - 6-bit register address<br>imm6 - 6-bit immediate value | src1 ← imm6<br>6-bit unsigned immediate value imm6 is stored in register src1. |
| out (src1, imm6) | 4-bit opcode<br>src1 - 6-bit register address<br>imm6 - 6-bit immediate value | RBUS[imm6] ← (src1)<br>The contents of register src1 are stored in RBUS register (in current bank) addressed by imm6. |
| outvld (src1) | 10-bit opcode | RBUS[VLD_CMD] ← (src1) |

-continued

| SYNTAX | OPCODE/ OPERAND(S) | EXECUTION |
|---|---|---|
| | src1 - 6-bit register address | The contents of register src1 are stored in RBUS register addressed by VLD_CMD (VLD commands) |
| outvldi (imm6) | 10-bit opcode imm6 - 6-bit immediate value | RBUS[VLD_CMD] ← imm6 The unsigned 6-bit immediate value imm6 is stored in RBUS register addressed by VLD_CMD (VLD commands) |
| outi (imm6_data, imm6) | 4-bit opcode imm6_data - 6-bit immediate value imm6 - 6-bit immediate value | RBUS [imm6] ← imm6_data The unsigned 6-bit immediate value imm6_data is stored in RBUS register (in current bank) addressed by imm6 |
| rti() | 16-bit opcode | PC ← return link |
| shi (src1, imm5) | 5-bit opcode src1 - 6-bit register address imm5 - 5-bit immediate value | Contents of src1 are shifted by +16/−15 bits, as identified by 5-bit unsigned immediate value imm5, and the result is stored in the register addressed by src1. If result is zero, Z condition is set; otherwise Z condition is cleared. If result is negative N condition is set; otherwise N condition is cleared. |
| | | Imm5   shift result |
| | | 0x0    shift by amount of r0 |
| | | 0x1    shift left 1 bit |
| | | ...    ... |
| | | 0x15   shift left 15 bits |
| | | 0x10   shift right 16 bits |
| | | ...    ... |
| | | 0x1f   shift right 1 bit |
| st (src1, src2) | 4-bit opcode src1 - 6-bit register address src2 - 6-bit register address | DMEM [src2] ← (src1) The contents of the register addressed by src1 are stored in the DRAM location addressed by the contents of register src2 |
| xor (src1, src2) | 4-bit opcode src1 - 6-bit register address src2 - 6-bit register address | src1 ← (src1) XOR (src2) If result is zero, Z condition is set; otherwise Z condition is cleared. |
| setf (reg, bitnum) | 10-bit opcode reg - 1-bit register address (identifies either register 0 or register 1) bitnum - 5-bit immediate value (identifies a bit number 0–31) | reg ← (reg) with bit [bitnum] = 1 A single bit of register 0 or register 1 is set to a 1 value. The register is identified by reg, and the bit to be set is identified by bitnum |
| resetf (reg, bitnum) opcode:0000 op [5:0] 001 010 | 10-bit opcode reg - 1-bit register address (identified either register 0 or register 1) bitnum - 5-bit immediate value (identifies a bit number 0–31) | reg ← (reg) with bit [bitnum] = 0 A single bit of register 0 or register 1 is set to a 0 value. The register is identified by reg, and the bit to be set is identified by bitnum |

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, principles of the present invention may be applied to memory interfaces used in applications other than digital audio/video signal processing. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An application specific integrated circuit for performing digital audio/video processing, comprising
a video decoder for decoding compressed video data delivered thereto;
an audio decoder for decoding compressed audio data delivered thereto;
a memory interface for delivering data to a dynamic random access memory for storing video and audio data, and for retrieving data from said dynamic random access memory; and
a central processing unit connected to said video decoder, said audio decoder, and said memory interface for controlling computations performed thereby, said central processing unit comprising:
an instruction memory storing instructions, said instruction memory having an output for delivery of a current instruction to said central processing unit to control operations thereof,
a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory,
a datapath connected to said output of said register file including components for performing digital computations upon data delivered through said output of said register file, and connected to said input of said register file for storing results of computations into said register file,
a program counter having an output connected to said instruction memory for delivering a current memory address thereto to cause said instruction memory to select an instruction therein for delivery to said central processing unit, and
a multiplexer, an output of said multiplexer being connected to said program counter for delivering an instruction memory address thereto, a first input of said multiplexer connected to said output of said register file, a second input of said multiplexer being derived from said current instruction output from said instruction memory and said current memory address output from said program counter, said multiplexer being responsive to said current instruction output from said instruction memory to deliver digital signals received at either said first or said second inputs thereof to said program counter.

2. The application specific integrated circuit of claim 1, wherein said central processing unit further comprises
an input/output interface for requesting transfer of digital signals from or to said central processing unit to or from said video decoder, said audio decoder or said memory interface, and for sending and receiving said digital signals as part of a requested transfer, said input/output interface having an address input for receiving an input/output request, and being connected to said datapath for sending or receiving said digital signals from or to said datapath and/or said register file, and a second multiplexer, an output of said second multiplexer being connected to said input/output interface for delivering an output request thereto, a first input of said second multiplexer being derived from said current instruction output from said instruction memory, a second input of said second multiplexer being connected to an address for said video decoder, said second multiplexer being responsive to said current instruction output from said instruction memory to deliver address signals received at either said first or said second inputs thereof to said address input of said input/output interface.

3. The application specific integrated circuit of claim 1, wherein said datapath is responsive to said current instruction delivered by said instruction memory to modify a bit of a data word delivered through said output of said register file to a predetermined value, and deliver a thus-modified data word to said input of said register file.

4. The application specific integrated circuit of claim 1, wherein said central processing unit further comprises a second multiplexer, a first input of said second multiplexer being connected to said output of said register file, a second input of said second multiplexer being connected to said input of said register file, said second multiplexer having an output and being responsive to a bypass signal to deliver digital signals received at said second input of said second multiplexer to said output of said second multiplexer, and otherwise delivering digital signals received at said first input of said second multiplexer to said output of said second multiplexer, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register written in response to a preceding instruction output by said instruction memory, said controller and watchdog circuit connected to said second multiplexer and generating said bypass signal upon detection that a register selected to receive data from said input of said register file in response to said preceding instruction, will be selected to deliver data to said output of said register file in response to said current instruction.

5. The application specific integrated circuit of claim 1, wherein said central processing unit further comprises an input interface for requesting transfer of digital signals to said central processing unit from said video decoder, said audio decoder or said memory interface, and for receiving said digital signals therefrom, said input interface being responsive to a current instruction output from said instruction memory to request transfer of digital signals to said central processing unit, said input interface being connected to said register file for delivering said digital signals to said input of said register file upon receipt, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register awaiting receipt of data from said input interface in response to a preceding instruction output by said instruction memory, said controller and watchdog circuit being responsive to said current instruction to detect whether a register selected to deliver data through said output of said register file in response to said current instruction, is awaiting receipt of data from said input interface in response to a preceding instruction, and if so, to delay execution of said current instruction until said register receives said data from said input interface.

6. The application specific integrated circuit of claim 1, wherein said central processing unit further comprises a scratchpad memory storing data for use in digital computations performed by said central processing unit, said datapath connected to said scratchpad memory for delivering data thereto and/or receiving data therefrom, said central processing unit being responsive to a first instruction to receive data from said scratchpad memory when said first instruction is associated with a first predetermined memory address, said central processing unit being responsive to said first instruction to receive data from said memory interface when said first instruction is associated with a second predetermined memory address, said central processing unit being responsive to a second instruction to deliver data to said scratchpad memory when said seconds instruction is associated with said first predetermined memory address, said central processing unit being responsive to said second instruction to deliver data to said memory interface when said second instruction is associated with said second predetermined memory address.

7. The application specific integrated circuit of claim 1, further comprising a host interface for delivering data to an external host computing circuit, and for receiving data from said external host computing circuit;

wherein said program counter is connected to said host interface, said program counter being responsive to data received from said host interface to deliver a current memory address specified by said host computing circuit to said instruction memory.

8. The application specific integrated circuit of claim 1, further comprising a host interface for delivering data to an external host computing circuit, and for receiving data from said external host computing circuit;

wherein said program counter is connected to said host interface, said program counter being responsive to data received from said host interface to deliver a current memory address to said host computing circuit.

9. The application specific integrated circuit of claim 1, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

10. The application specific integrated circuit of claim 1, wherein said central processing unit is responsive to a current instruction to deliver a command to said memory interface causing said memory interface to transfer instructions from said dynamic random access memory to said instruction memory of said central processing unit.

11. An application specific integrated circuit for performing digital audio/video processing, comprising
- a video decoder for decoding compressed video data delivered thereto;
- an audio decoder for decoding compressed audio data delivered thereto;
- a memory interface for delivering data to a dynamic random access memory for storing video and audio data, and for retrieving data from said dynamic random access memory; and
- a central processing unit connected to said video decoder, said audio decoder, and said memory interface for controlling computations performed thereby, said central processing unit comprising:
  - an instruction memory storing instructions, said instruction memory having an output for delivery of a current instruction to said central processing unit to control operations thereof,
  - a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory,
  - a datapath connected to said output of said register file including components for performing digital computations upon data delivered through said output of said register file, and connected to said input of said register file for storing results of computations into said register file,
  - an input/output interface for requesting transfer of digital signals from or to said central processing unit to or from said video decoder, said audio decoder or said memory interface, and for sending or receiving said digital signals as part of a requested transfer, said input/output interface having an address input for receiving an input/output request, and being connected to said datapath for sending or receiving said digital signals from or to said datapath and/or said register file, and
  - a multiplexer, an output of said multiplexer being connected to said input/output interface for delivering an output request thereto, a first input of said multiplexer being derived from said current instruction output from said instruction memory, a second input of said multiplexer being connected to an address for said video decoder, said multiplexer being responsive to said current instruction output from said instruction memory to deliver address signals received at either said first or said second inputs thereof to said address input of said input/output interface.

12. The application specific integrated circuit of claim 11, wherein said datapath is responsive to said current instruction delivered by said instruction memory to modify a bit of a data word delivered through said output of said register file to a predetermined value, and deliver a thus- modified data word to said input of said register file.

13. The application specific integrated circuit of claim 11, wherein said central processing unit further comprises
- a second multiplexer, a first input of said second multiplexer being connected to said output of said register file, a second input of said second multiplexer being connected to said input of said register file, said second multiplexer having an output and being responsive to a bypass signal to deliver digital signals received at said second input of said second multiplexer to said output of said second multiplexer, and otherwise delivering digital signals received at said first input of said second multiplexer to said output of said second multiplexer, and
- a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register written in response to a preceding instruction output by said instruction memory, said controller and watchdog circuit connected to said second multiplexer and generating said bypass signal upon detection that a register selected to receive data from said input of said register file in response to said preceding instruction, will be selected to deliver data to said output of said register file in response to said current instruction.

14. The application specific integrated circuit of claim 11, wherein said input/output interface is connected to said register file for delivering said digital signals to said input of said register file upon receipt, and
- a controller and watchdog circuit responsive to said current instruction output from said instruction memory, connected to said register file and producing said control signals for selecting a register to receive data from said input of said register file and deliver data to said output of said register file,
- said controller and watchdog circuit including a storage location for storing an identification of a register awaiting receipt of data from said input interface in response to a preceding instruction output by said instruction memory, said controller and watchdog circuit being responsive to said current instruction to detect whether a register selected to deliver data through said output of said register file in response to said current instruction, is awaiting receipt of data from said input interface in response to a preceding instruction, and if so, to delay execution of said current instruction until said register receives said data from said input interface.

15. The application specific integrated circuit of claim 11, wherein said central processing unit further comprises a scratchpad memory storing data for use in digital computations performed by said central processing unit, said datapath connected to said scratchpad memory for delivering data thereto and/or receiving data therefrom,
- said central processing unit being responsive to a first instruction to receive data from said scratchpad memory when said first instruction is associated with a first predetermined memory address, said central processing unit being responsive to said first instruction to receive data from said memory interface when said first instruction is associated with a second predetermined memory address,
- said central processing unit being responsive to a second instruction to deliver data to said scratchpad memory when said second instruction is associated with said first predetermined memory address, said central processing unit being responsive to said second instruction to deliver data to said memory interface when said second instruction is associated with said second predetermined memory address.

16. The application specific integrated circuit of claim 11, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

17. The application specific integrated circuit of claim 11, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address to said host computing circuit.

18. The application specific integrated circuit of claim 11, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

19. The application specific integrated circuit of claim 11, wherein said datapath is responsive to a current instruction to deliver a command to said memory interface causing said memory interface to transfer instructions from said dynamic random access memory to said instruction memory of said central processing unit.

20. An application specific integrated circuit for performing digital audio/video processing, comprising a video decoder for decoding compressed video data delivered thereto;

an audio decoder for decoding compressed audio data delivered thereto;

a memory interface for delivering data to a dynamic random access memory for storing video and audio data, and for retrieving data from said dynamic random access memory; and a central processing unit connected to said video decoder, said audio decoder, and said memory interface for controlling computations performed thereby, said central processing unit comprising:

an instruction memory storing instructions, said instruction memory having an output for delivery of a current instruction to said central processing unit to control operations thereof, a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory, and a datapath connected to said output of said register file including components for performing digital computations upon data delivered through said output of said register file, and connected to said input of said register file for storing results of computations into said register file, said central processing unit being responsive to said current instruction delivered by said instruction memory to modify a bit of a data word delivered through said output of said register file to a predetermined value, and deliver a thus-modified data word to said input of said register file.

21. The application specific integrated circuit of claim 20, wherein said central processing unit further comprises a multiplexer, a first input of said multiplexer being connected to said output of said register file, a second input of said multiplexer being connected to said input of said register file, said multiplexer having an output and being responsive to a bypass signal to deliver digital signals received at said second input of said multiplexer to said output of said multiplexer, and otherwise delivering digital signals received at said first input of said multiplexer to said output of said multiplexer, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register written in response to a preceding instruction output by said instruction memory, said controller and watchdog circuit connected to said multiplexer and generating said bypass signal upon detection that a register selected to receive data from said input of said register file in response to said preceding instruction, will be selected to deliver data to said output of said register file in response to said current instruction.

22. The application specific integrated circuit of claim 20, wherein said central processing unit further comprises an input interface for requesting transfer of digital signals to said central processing unit from said video decoder, said audio decoder or said memory interface, and for receiving said digital signals therefrom, said input interface being responsive to a current instruction output from said instruction memory to request transfer of digital signals to said central processing unit, said input interface being connected to said register file for delivering said digital signals to said input of said register file upon receipt, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register awaiting receipt of data from said input interface in response to a preceding instruction output by said instruction memory, said controller and watchdog circuit being responsive to said current instruction to detect whether a register selected to deliver data through said output of said register file in response to said current instruction, is awaiting receipt of data from said input interface in response to a preceding instruction, and if so, to delay execution of said current instruction until said register receives said data from said input interface.

23. The application specific integrated circuit of claim 2E, wherein said central processing unit further comprises a scratchpad memory storing data for use in digital computations performed by said central processing unit, said datapath connected to said scratchpad memory for delivering data thereto and/or receiving data therefrom, said central processing unit being responsive to a first instruction to receive data from said scratchpad memory when said first instruction is associated with a first predetermined memory address, said central processing unit being responsive to said first instruction to receive data from said memory interface when said first instruction is associated with a second predetermined memory address, said central processing unit being responsive to a second instruction to deliver data to said scratchpad memory when said second instruction is associated with said first predetermined memory address, said central processing unit being responsive to said second instruction to deliver data to said memory interface when said second instruction is associated with said second predetermined memory address.

24. The application specific integrated circuit of claim 20, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

25. The application specific integrated circuit of claim 20, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address to said host computing circuit.

26. The application specific integrated circuit of claim 20, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

27. The application specific integrated circuit of claim 20, wherein said datapath is responsive to a current instruction to deliver a command to said memory interface causing said memory interface to transfer instructions from said dynamic random access memory to said instruction memory of said central processing unit.

28. An application specific integrated circuit for performing digital audio/video processing, comprising a video decoder for decoding compressed video data delivered thereto;

an audio decoder for decoding compressed audio data delivered thereto;

a memory interface for delivering data to a dynamic random access memory for storing video and audio data, and for retrieving data from said dynamic random access memory; and a central processing unit connected to said video decoder, said audio decoder, and said memory interface for controlling computations performed thereby, said central processing unit comprising:

a register file storing data for use in digital computations performed by said central processing unit, said register file having an input through which data can be stored into registers thereof, and an output through which data stored in registers thereof is delivered, and control inputs for selecting a register to receive data from said input and deliver data to said output, a multiplexer, a first input of said multiplexer being connected to said output of said register file, a second input of said multiplexer being connected to said input of said register file, said multiplexer having an output and being responsive to a bypass signal to deliver digital signals received at said second input of said multiplexer to said output of said multiplexer, and otherwise delivering digital signals received at said first input of said multiplexer to said output of said multiplexer, a datapath connected to said output of said multiplexer including components for performing digital computations upon data delivered through said output of said multiplexer, and connected to said input of said register file for storing results of computations into said register file, an instruction memory storing instructions, said instruction memory having an output for delivery of a current instruction to said central processing unit to control operations thereof, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register written in response to a preceding instruction output by said instruction memory, said controller and watchdog circuit connected to said multiplexer and generating said bypass signal upon detection that a register selected to receive data from said input of said register file in response to said preceding instruction, will be selected to deliver data to said output of said register file in response to said current instruction.

29. The application specific integrated circuit of claim 28, wherein said central processing unit further comprises an input interface for requesting transfer of digital signals to said central processing unit from said video decoder, said audio decoder or said memory interface, and for receiving said digital signals therefrom, said input interface being responsive to a current instruction output from said instruction memory to request transfer of digital signals to said central processing unit, said input interface being connected to said register file for delivering said digital signals to said input of said register file upon receipt, and wherein said controller and watchdog circuit includes a storage location for storing an identification of a register awaiting receipt of data from said input interface in response to a preceding instruction output by said instruction memory, said controller and watchdog circuit being responsive to said current instruction to detect whether a register selected to deliver data through said output of said register file in response to said current instruction, is awaiting receipt of data from said input interface in response to a preceding instruction, and if so, to delay execution of said current instruction until said register receives said data from said input interface.

30. The application specific integrated circuit of claim 28, wherein said central processing unit further comprises a scratchpad memory storing data for use in digital computations performed by said central processing unit, said datapath connected to said scratchpad memory for delivering data thereto and/or receiving data therefrom, said central processing unit being responsive to a first instruction to receive data from said scratchpad memory when said first instruction is associated with a first predetermined memory address, said central processing unit being responsive to said first instruction to receive data from said memory interface when said first instruction is associated with a second predetermined memory address, said central processing unit being responsive to a second instruction to deliver data to said scratchpad memory when said second instruction is associated with said first predetermined memory address, said central processing unit being responsive to said second instruction to deliver data to said memory interface when said second instruction is associated with said second predetermined memory address.

31. The application specific integrated circuit of claim 28, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

32. The application specific integrated circuit of claim 28, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address to said host computing circuit.

33. The application specific integrated circuit of claim 28, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

34. The application specific integrated circuit of claim 28, wherein said datapath is responsive to a current instruction to deliver a command to said memory interface causing said memory interface to transfer instructions from said dynamic random access memory to said instruction memory of said central processing unit.

35. An application specific integrated circuit for performing digital audio/video processing, comprising a video decoder for decoding compressed video data delivered thereto;

an audio decoder for decoding compressed audio data delivered thereto;

a memory interface for delivering data to a dynamic random access memory for storing video and audio data, and for retrieving data from said dynamic random access memory; and a central processing unit connected to said video decoder, said audio decoder, and said memory interface for controlling computations performed thereby, said central processing unit comprising:

an instruction memory storing instructions, said instruction memory having an output for delivery of a current instruction to said central processing unit to control operations thereof, and a register file storing data for use in digital computations performed by said central processing unit, said register file having an input through which data can be stored into registers thereof, and an output through which data stored in registers thereof is delivered, and control inputs for selecting a register to receive data from said input and deliver data to said output, a datapath connected to said output of said register including components for performing digital computations upon data delivered through said output of said register, and connected to said input of said register file for storing results of computations into said register file, an input interface for requesting transfer of digital signals to said central processing unit from said video decoder, said audio decoder or said memory interface, and for receiving said digital signals therefrom, said input interface being responsive to a current instruction output from said instruction memory to request transfer of digital signals to said central processing unit, said input interface being connected to said register file for delivering said digital signals to said input of said register file upon receipt, and a controller and watchdog circuit responsive to said current instruction output from said instruction memory, connected to said register file and producing said control signals for selecting a register to receive data from said input of said register file and deliver data to said output of said register file, said controller and watchdog circuit including a storage location for storing an identification of a register awaiting receipt of data from said input interface in response to a preceding instruction output by said instruction memory, said controller and watchdog circuit being responsive to said current instruction to detect whether a register selected to deliver data through said output of said register file in response to said current instruction, is awaiting receipt of data from said input interface in response to a preceding instruction, and if so, to delay execution of said current instruction until said register receives said data from said input interface.

36. The application specific integrated circuit of claim 35, wherein said central processing unit further comprises a scratchpad memory storing data for use in digital computations performed by said central processing unit, said datapath connected to said scratchpad memory for delivering data thereto and/or receiving data therefrom, said input interface being responsive to a first instruction to receive data from said scratchpad memory when said first instruction is associated with a first predetermined memory address, said input interface being responsive to said first instruction to receive data from said memory interface when said first instruction is associated with a second predetermined memory address, said central processing unit being responsive to a second instruction to deliver data to said scratchpad memory when said second instruction is associated with said first predetermined memory address, said central processing unit being responsive to said second instruction to deliver data to said memory interface when said second instruction is associated with said second predetermined memory address.

37. The application specific integrated circuit of claim 35, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

38. The application specific integrated circuit of claim 35, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address to said host computing circuit.

39. The application specific integrated circuit of claim 35, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

40. The application specific integrated circuit of claim 35, wherein said datapath is responsive to a current instruction to deliver a command to said memory interface causing said memory interface to transfer instructions from said dynamic random access memory to said instruction memory of said central processing unit.

41. An application specific integrated circuit for performing digital audio/video processing, comprising a video decoder for decoding compressed video data delivered thereto;

an audio decoder for decoding compressed audio data delivered thereto;

a memory interface for delivering data to a dynamic random access memory for storing video and audio data, and for retrieving data from said dynamic random access memory; and a central processing unit connected to said video decoder, said audio decoder, and said memory interface for controlling computations performed thereby, said central processing unit comprising:

an instruction memory storing instructions, said instruction memory having an output for delivery of a current instruction to said central processing unit to control operations thereof, a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory, a datapath connected to said output of said register file including components for performing digital computations upon data delivered through said output of said register file, and connected to said input of said register file for storing results of computations into said register file, a scratchpad memory storing data for use in digital computations performed by said central processing unit, said datapath connected to said scratchpad memory for delivering data thereto and/or receiving data therefrom, said central processing unit being responsive to a first instruction to receive data from said scratchpad memory when said first instruction is associated with a first predetermined memory address, said central processing unit being responsive to said first instruction to receive data from said memory interface when said first instruction is associated with a second predetermined memory address, said central processing unit being responsive to a second instruction to deliver data to said scratchpad memory when said second instruction is associated with said first predetermined memory address, said central processing unit being responsive to said second instruction to deliver data to said memory interface when said second instruction is associated with said second predetermined memory address.

42. The application specific integrated circuit of claim 41, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

43. The application specific integrated circuit of claim 41, further comprising a host interface for delivering data to an external host computing circuit, and for receiving data from said external host computing circuit;

wherein said central processing unit further comprises a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address to said host computing circuit.

44. The application specific integrated circuit of claim 41, further comprising a host interface for delivering data to an external host computing circuit, and for receiving data from said external host computing circuit;

wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

45. The application specific integrated circuit of claim 41, wherein said datapath is responsive to a current instruction to deliver a command to said memory interface causing said memory interface to transfer instructions from said dynamic random access memory to said instruction memory of said central processing unit.

46. An application specific integrated circuit for performing digital audio/video processing, comprising a video decoder for decoding compressed video data delivered thereto;

an audio decoder for decoding compressed audio data delivered thereto;

a host interface for delivering data to an external host computing circuit, and for receiving data from said external host computing circuit;

a memory interface for delivering data to a dynamic random access memory for storing video and audio data, and for retrieving data from said dynamic random access memory; and a central processing unit connected to said video decoder, said audio decoder, and said memory interface for controlling computations performed thereby, said central processing unit comprising:

an instruction memory storing instructions, said instruction memory having an output for delivery of a current instruction to said central processing unit to control operations thereof, a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory, a datapath connected to said output of said register file including components for performing digital computations upon data delivered through said output of said register file, and connected to said input of said register file for storing results of computations into said register file, and a program counter having an output connected to said instruction memory for delivering a current memory address thereto to cause said instruction memory to select an instruction therein for delivery to said central processing unit, said program counter being connected to said host interface, said program counter being responsive to data received from said host interface to deliver a current memory address specified by said host computing circuit to said instruction memory.

47. The application specific integrated circuit of claim 46, wherein said program counter is responsive to data received from said host interface to deliver a current memory address to said host computing circuit.

48. The application specific integrated circuit of claim 46, wherein said central processing unit further comprises an instruction register for storing a current instruction from said instruction memory for controlling operations of said central processing unit, said instruction register being connected to said host interface, said instruction register being responsive to data received from said host interface to deliver a current instruction from said host computing circuit to said instruction register for controlling operations of said central processing unit.

49. The application specific integrated circuit of claim 46, wherein said datapath is responsive to a current instruction to deliver a command to said memory interface causing said memory interface to transfer instructions from said dynamic random access memory to said instruction memory of said central processing unit.

50. An application specific integrated circuit for performing digital audio/video processing, comprising
   a video decoder for decoding compressed video data delivered thereto;
   an audio decoder for decoding compressed audio data delivered thereto;
   a host interface for delivering data to an external host computing circuit, and for receiving data from said external host computing circuit;
   a memory interface for delivering data to a dynamic random access memory for storing video and audio data, and for retrieving data from said dynamic random access memory; and
   a central processing unit connected to said video decoder, said audio decoder, and said memory interface for controlling computations performed thereby, said central processing unit comprising:
      an instruction memory storing instructions, said instruction memory having an output for delivery of a current instruction to said central processing unit to control operations thereof,
      a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory,
      a datapath connected to said output of said register file including components for performing digital computations upon data delivered through said output of said register file, and connected to said input of said register file for storing results of computations into said register file, and
      a program counter having an output connected to said instruction memory for delivering a current memory address thereto to cause said instruction memory to select an instruction therein for delivery to said central processing unit,
      said program counter being connected to said host interface, said program counter being responsive to data received from said host interface to deliver a current memory address to said host computing circuit.

51. The application specific integrated circuit of claim 50, wherein said central processing unit further comprises an instruction register for storing a current instruction from said instruction memory for controlling operations of said central processing unit,
   said instruction register being connected to said host interface, said instruction register being responsive to data received from said host interface to deliver a current instruction from said host computing circuit to said instruction register for controlling operations of said central processing unit.

52. The application specific integrated circuit of claim 50, wherein said datapath is responsive to a current instruction to deliver a command to said memory interface causing said memory interface to transfer instructions from said dynamic random access memory to said instruction memory of said central processing unit.

53. An application specific integrated circuit for performing digital audio/video processing, comprising
   a video decoder for decoding compressed video data delivered thereto;
   an audio decoder for decoding compressed audio data delivered thereto;
   a memory interface for delivering data to a dynamic random access memory for storing video and audio data, and for retrieving data from said dynamic random access memory; and
   a central processing unit connected to said video decoder, said audio decoder, and said memory interface for controlling computations performed thereby, said central processing unit comprising:
      an instruction register for storing a current instruction for controlling operations of said central processing unit,
      an instruction memory storing instructions, said instruction memory having an output for delivery of a current instruction to said instruction register,
      a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory, and
      a datapath connected to said output of said register file including components for performing digital computations upon data delivered through said output of said register file, and connected to said input of said register file for storing results of computations into said register file,
      said instruction register being connected to said host interface, said instruction register being responsive to data received from said host interface to deliver a current instruction from said host computing circuit to said instruction register for controlling operations of said central processing unit.

54. The application specific integrated circuit of claim 53, wherein said datapath is responsive to a current instruction to deliver a command to said memory interface causing said memory interface to transfer instructions from said dynamic random access memory to said instruction memory of said central processing unit.

55. An application specific integrated circuit for performing digital audio/video processing, comprising
   a video decoder for decoding compressed video data delivered thereto;
   an audio decoder for decoding compressed audio data delivered thereto;
   a memory interface for delivering data to a dynamic random access memory for storing video and audio data and instructions for said application specific integrated circuit, and for retrieving data or instructions from said dynamic random access memory; and a central processing unit connected to said video decoder, said audio decoder, and said memory interface for controlling computations performed thereby, said central processing unit comprising:

an instruction memory storing instructions, said instruction memory having an output for delivery of a current instruction to said central processing unit to control operations thereof, a register file storing data for use in digital computations performed by said central processing unit, said register file having an input through which data can be stored into registers thereof, and an output through which data stored in registers thereof is delivered, said register file selecting a register to receive data from said input and deliver data to said output in response to said current instruction output by said instruction memory, a datapath connected to said output of said register file including components for performing digital computations upon data delivered through said output of said register file, and connected to said input of said register file for storing results of computations into said register file, said central processing unit being responsive to a current instruction to deliver a command to said memory interface causing said memory interface to transfer instructions from said dynamic random access memory to said instruction memory of said central processing unit.

* * * * *

UNITED STATES PATENT AND TRADEMARK OFFICE
CERTIFICATE OF CORRECTION

PATENT NO.   : 6,012,137
DATED        : January 4, 2000
INVENTOR(S)  : Bublil et al.

Page 1 of 2

It is certified that error appears in the above-identified patent and that said Letters Patent is hereby corrected as shown below:

Column 1,
Line 56, please delete "can cannot" and replace with -- cannot --;

Column 2,
Line 37, please delete "that these" and replace with -- these --;

Column 9,
Line 4, please delete "causes controller 208 to generates" and replace with -- causes controller 208 to generate --;
Line 21, please delete "or 2" and replace with -- or IMM22 --;
Line 58, please delete "tb PC" and replace with -- to PC --;

Column 10,
Line 63, please delete "via the an" and replace with -- via the on --;

Column 11,
Line 27, please delete "for on busses" and replace with -- on busses --;

Column 12,
Line 34, please delete "to produces a" and replace with -- to produce a --;

Column 14,
Line 26, please delete "to as part of" and replace with -- to a part of --;

Column 15,
Line 42, please delete "an instructions" and replace with -- instructions --;

UNITED STATES PATENT AND TRADEMARK OFFICE
CERTIFICATE OF CORRECTION

PATENT NO. : 6,012,137
DATED : January 4, 2000
INVENTOR(S) : Bublil et al.

It is certified that error appears in the above-identified patent and that said Letters Patent is hereby corrected as shown below:

Column 19,
Line 26, please delete "BYPASS" and replace with -- BYPASS 2 --;
Line 34, please delete "(src2))" and replace with -- (src2) --;

Column 20,
Line 6, please delete "more filly below" and replace with -- more fully below --;

Column 22,
Line 65, please delete "is continues" and replace with -- is continued --;

Column 25,
Line 66, please delete "JMPR" and replace with -- JUMPR --;

Column 26,
Line 25, please delete "in the in the" and replace with -- in the --;

Column 34,
Line 27, please delete "said seconds instruction" and replace with -- said second instruction --;

Column 39,
Line 16, please delete "of claim 2E" and replace with -- of claim 20 --.

Signed and Sealed this

Twentieth Day of November, 2001

Attest:

*Nicholas P. Godici*

NICHOLAS P. GODICI
*Attesting Officer*  *Acting Director of the United States Patent and Trademark Office*